(12) United States Patent
Ramsey et al.

(10) Patent No.: US 7,996,783 B2
(45) Date of Patent: Aug. 9, 2011

(54) WIDGET SEARCHING UTILIZING TASK FRAMEWORK

(75) Inventors: William D. Ramsey, Redmond, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/367,292

(22) Filed: Mar. 2, 2006

(65) Prior Publication Data
US 2007/0209013 A1    Sep. 6, 2007

(51) Int. Cl.
*G06F 3/048* (2006.01)
(52) U.S. Cl. ......... 715/764; 345/470; 715/224; 715/826
(58) Field of Classification Search .................. 715/769, 715/224, 826, 764; 345/470
See application file for complete search history.

(56) References Cited

U.S. PATENT DOCUMENTS

| | | | |
|---|---|---|---|
| 4,736,296 A | | 4/1988 | Katayama et al. |
| 4,965,763 A | | 10/1990 | Zamora |
| 4,974,191 A | | 11/1990 | Amirghodsi et al. |
| 5,208,816 A | | 5/1993 | Seshardi et al. |
| 5,477,451 A | | 12/1995 | Brown et al. |
| 5,577,241 A | | 11/1996 | Spencer |
| 5,625,814 A | | 4/1997 | Luciw |
| 5,636,036 A | | 6/1997 | Ashbey |
| 5,696,962 A | | 12/1997 | Kupiec |
| 5,748,974 A | | 5/1998 | Johnson |
| 5,752,244 A * | | 5/1998 | Rose et al. .................. 707/5 |
| 5,754,173 A * | | 5/1998 | Hiura et al. .................. 715/744 |
| 5,754,174 A * | | 5/1998 | Carpenter et al. ............ 715/810 |
| 5,794,259 A * | | 8/1998 | Kikinis .................. 715/207 |
| 5,832,459 A * | | 11/1998 | Cameron et al. ................ 705/26 |
| 5,855,015 A * | | 12/1998 | Shoham ............................ 707/5 |
| 5,892,900 A | | 4/1999 | Ginter et al. |
| 5,999,948 A | | 12/1999 | Nelson et al. |
| 6,055,528 A | | 4/2000 | Evans |
| 6,078,914 A * | | 6/2000 | Redfern ................................ 1/1 |
| 6,088,700 A * | | 7/2000 | Larsen et al. .................... 707/10 |

(Continued)

FOREIGN PATENT DOCUMENTS

EP    1 571 578 A1    9/2005

(Continued)

OTHER PUBLICATIONS

"Google Flight search takes off", by Elinor Mills, published Oct. 28, 2005, pp. 1-3.*

(Continued)

*Primary Examiner* — William L Bashore
*Assistant Examiner* — Gregory A Distefano
(74) *Attorney, Agent, or Firm* — Merchant & Gould P.C.

(57) ABSTRACT

A task framework and a semantic reasoning engine are combined to provide a scalable mechanism for dealing with extremely large numbers of widgets, allowing users to both find a widget and automatically fill-in whatever functionality is available on the widget. Calling applications are employed to obtain task information from each widget. The calling application also receives user queries that can be resolved by a widget. A task reasoning process based on an adaptive semantic reasoning engine utilizes the task information to select a widget best suited to respond to a user's query. The task reasoning process can also be employed to determine "best-guess" slot filling of the selected widget. The calling application can then invoke the selected widget and, if available, fill appropriate slots with information to facilitate user interaction with the selected widget. Instances can be client- and/or server-side based.

11 Claims, 14 Drawing Sheets

U.S. PATENT DOCUMENTS

| | | | |
|---|---|---|---|
| 6,118,939 A | 9/2000 | Nack et al. | |
| 6,212,494 B1 | 4/2001 | Boguraev | |
| 6,278,996 B1 | 8/2001 | Richardson et al. | |
| 6,314,398 B1 | 11/2001 | Junqua et al. | |
| 6,513,006 B2 | 1/2003 | Howard et al. | |
| 6,643,620 B1 | 11/2003 | Contolini et al. | |
| 6,675,159 B1 | 1/2004 | Lin et al. | |
| 6,678,677 B2 | 1/2004 | Roux et al. | |
| 6,678,694 B1 | 1/2004 | Zimmermann et al. | |
| 6,690,390 B1 | 2/2004 | Walters et al. | |
| 6,724,403 B1* | 4/2004 | Santoro et al. | 715/765 |
| 6,751,606 B1 | 6/2004 | Fries et al. | |
| 6,816,857 B1 | 11/2004 | Weissman et al. | |
| 6,850,252 B1 | 2/2005 | Hoffberg | |
| 6,901,399 B1 | 5/2005 | Corston et al. | |
| 6,904,402 B1 | 6/2005 | Wang et al. | |
| 6,910,003 B1 | 6/2005 | Arnold et al. | |
| 6,947,923 B2 | 9/2005 | Cha et al. | |
| 7,020,607 B2 | 3/2006 | Adachi | |
| 7,020,658 B1* | 3/2006 | Hill | 707/102 |
| 7,328,199 B2 | 2/2008 | Ramsey et al. | |
| 7,523,099 B1 | 4/2009 | Egnor et al. | |
| 2002/0032680 A1 | 3/2002 | Garber | |
| 2002/0042793 A1 | 4/2002 | Choi | |
| 2002/0045463 A1 | 4/2002 | Chen et al. | |
| 2002/0049750 A1 | 4/2002 | Venkatram | |
| 2002/0059132 A1 | 5/2002 | Quay | |
| 2002/0065959 A1 | 5/2002 | Kim et al. | |
| 2002/0101448 A1 | 8/2002 | Sanderson | |
| 2002/0124115 A1 | 9/2002 | McLean et al. | |
| 2002/0143949 A1 | 10/2002 | Rajarajan et al. | |
| 2002/0152190 A1 | 10/2002 | Biebesheimer et al. | |
| 2003/0023598 A1 | 1/2003 | Janakiraman et al. | |
| 2003/0078766 A1 | 4/2003 | Appelt | |
| 2003/0084035 A1 | 5/2003 | Emerick | |
| 2003/0120700 A1 | 6/2003 | Boudnik et al. | |
| 2003/0135584 A1 | 7/2003 | Roberts et al. | |
| 2003/0222912 A1 | 12/2003 | Fairweather | |
| 2004/0030556 A1 | 2/2004 | Bennett | |
| 2004/0030697 A1* | 2/2004 | Cochran et al. | 707/9 |
| 2004/0030710 A1 | 2/2004 | Shadle | |
| 2004/0034652 A1 | 2/2004 | Hofmann et al. | |
| 2004/0111419 A1 | 6/2004 | Cook et al. | |
| 2004/0117395 A1 | 6/2004 | Gong et al. | |
| 2004/0122674 A1 | 6/2004 | Bangalore et al. | |
| 2004/0130572 A1 | 7/2004 | Bala | |
| 2004/0148154 A1 | 7/2004 | Acero et al. | |
| 2004/0181749 A1 | 9/2004 | Chellapilla et al. | |
| 2004/0220893 A1 | 11/2004 | Spivack | |
| 2004/0236580 A1 | 11/2004 | Bennett | |
| 2004/0250255 A1 | 12/2004 | Kraiss et al. | |
| 2004/0260534 A1 | 12/2004 | Pak et al. | |
| 2004/0260689 A1 | 12/2004 | Colace | |
| 2004/0267725 A1 | 12/2004 | Harik | |
| 2005/0027666 A1 | 2/2005 | Beck et al. | |
| 2005/0028133 A1 | 2/2005 | Ananth et al. | |
| 2005/0034098 A1 | 2/2005 | DeSchryver et al. | |
| 2005/0044058 A1* | 2/2005 | Matthews et al. | 707/1 |
| 2005/0049852 A1 | 3/2005 | Chao | |
| 2005/0049874 A1 | 3/2005 | Coffman et al. | |
| 2005/0065995 A1 | 3/2005 | Milstein et al. | |
| 2005/0075859 A1 | 4/2005 | Ramsey | |
| 2005/0075878 A1 | 4/2005 | Balchandran et al. | |
| 2005/0078805 A1 | 4/2005 | Mills et al. | |
| 2005/0080625 A1 | 4/2005 | Bennett et al. | |
| 2005/0080782 A1 | 4/2005 | Ratnaparkhi et al. | |
| 2005/0086059 A1 | 4/2005 | Bennett | |
| 2005/0114854 A1 | 5/2005 | Padisetty et al. | |
| 2005/0131672 A1 | 6/2005 | Dalal et al. | |
| 2005/0132380 A1 | 6/2005 | Chow | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0187818 A1 | 8/2005 | Zito et al. | |
| 2005/0192992 A1 | 9/2005 | Reed | |
| 2005/0193055 A1 | 9/2005 | Angel et al. | |
| 2005/0216356 A1* | 9/2005 | Pearce et al. | 705/26 |
| 2005/0228744 A1 | 10/2005 | McHale | |
| 2005/0246726 A1 | 11/2005 | Labrou | |
| 2005/0257148 A1 | 11/2005 | Goodman et al. | |
| 2005/0283473 A1* | 12/2005 | Rousso et al. | 707/5 |
| 2006/0005207 A1* | 1/2006 | Louch et al. | 719/328 |
| 2006/0059434 A1 | 3/2006 | Boss et al. | |
| 2006/0064302 A1 | 3/2006 | Ativanichayaphong et al. | |
| 2006/0064411 A1 | 3/2006 | Gross et al. | |
| 2006/0107219 A1 | 5/2006 | Ahya et al. | |
| 2006/0129463 A1 | 6/2006 | Zicherman | |
| 2006/0156248 A1* | 7/2006 | Chaudhri et al. | 715/779 |
| 2006/0179404 A1 | 8/2006 | Yolleck et al. | |
| 2006/0206835 A1* | 9/2006 | Chaudhri et al. | 715/781 |
| 2007/0027850 A1 | 2/2007 | Chan et al. | |
| 2007/0038614 A1 | 2/2007 | Guha | |
| 2007/0038934 A1* | 2/2007 | Fellman | 715/700 |
| 2007/0067217 A1 | 3/2007 | Schachter et al. | |
| 2007/0100688 A1 | 5/2007 | Book | |
| 2007/0101279 A1* | 5/2007 | Chaudhri et al. | 715/762 |
| 2007/0101297 A1* | 5/2007 | Forstall et al. | 715/841 |
| 2007/0106495 A1 | 5/2007 | Ramsey et al. | |
| 2007/0106496 A1* | 5/2007 | Ramsey et al. | 704/9 |
| 2007/0124263 A1 | 5/2007 | Katariya et al. | |
| 2007/0130124 A1 | 6/2007 | Ramsey et al. | |
| 2007/0130134 A1 | 6/2007 | Ramsey et al. | |
| 2007/0130186 A1* | 6/2007 | Ramsey et al. | 707/101 |
| 2007/0192179 A1* | 8/2007 | Van Luchene | 705/14 |

FOREIGN PATENT DOCUMENTS

| | | |
|---|---|---|
| EP | 1 580 666 A2 | 9/2005 |
| WO | WO0129823 A1 | 4/2001 |
| WO | WO03001413 A1 | 1/2003 |
| WO | WO 2004/017230 A1 | 2/2004 |
| WO | WO2004/017230 A1 | 2/2004 |
| WO | WO 2005/036365 A2 | 4/2005 |

OTHER PUBLICATIONS

U.S. Appl. No. 11/290,076, filed Nov. 30, 2005, Ramsey, et al.
U.S. Appl. No. 11/246,847, filed Oct. 7, 2005, Ramsey, et al.
U.S. Appl. No. 11/270,407, filed Nov. 9, 2005, Ramsey, et al.
U.S. Appl. No. 11/294,581, filed Dec. 5, 2005, Yao, et al.
U.S. Appl. No. 11/294,262, filed Dec. 5, 2005, Ramsey, et al.
U.S. Appl. No. 11/270,393, filed Nov. 9, 2005, Ramsey, et al.
U.S. Appl. No. 11/294,265, filed Dec. 5, 2005, Ramsey, et al.
"DTS: Programming: Creating the Custom Task Framework", 1 page, accessible at: http://msdn.microsoft.com/library/default.asp?url=/library/en-us/dtsprog/dtspcusttskc_3hwr.asp, last accessed Jan. 5, 2006.
Ernst, et al., "A Task Framework for the Web Interface W2H", Bioinformatics, 2003, pp. 278-282, vol. 19, No. 2, Oxford University Press.
Multi-Agent Systems Lab, "TAEMS: A Framework for Task Analysis, Environment Modeling, and Simulation", 3 pages, acessible at: http://dis.cs.umass.edu/research/taems/, last accessed Jan. 5, 2006.
Hochberg, et al., "A Flexible Framework for Developing Mixed-Initiative Dialog Systems", Association for Computational Linguistics, Proceedings of the Third SIGdial Workshop on Discourse and Dialogue, Jul. 2002, pp. 60-63, Philadelphia.
AgileTek, "Componentized Architecture", 2 pages, accessible at: http://www.agiletek.com/agileplus#CompArchitecture, last accessed Jan. 5, 2006.
H. Lieberman, et al., "Instructible Agents: Software That Just Keeps Getting Better", IBM Systems Journal, 1996, pp. 539-556, vol. 35, Nos. 3 and 4.
"Technical Forum: Machine Intelligence and the Turing Test", IBM Systems Journal, 2002, pp. 524-539, vol. 41, No. 3.
O. Conlan, et al., "Applying Adaptive Hypermedia Techniques to Semantic Web Service Composition", In Proceedings of AH 2003: Workshop on Adaptive Hypermedia and Adaptive Web-based Systems, 2003, pp. 53-62.
H. Liu, et al., "Goose: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.

Leon Peshkin, "Research Statement", 2 pages, accessible at: http://people.csail.mit.edu/pesha/my_res.pdf, last accessed Jan. 5, 2006.
Korns Associates "Our Intelligent Agents", 4 pages, accessible at: http://www.korns.com/technology.htm, last accessed Jan. 5, 2006.
V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.
Esposito, Dino. "Browser Helper Objects:The Browser the Way You Want It. Microsoft Corporation", Jan. 1999, 12 pages.
Usability for component-based portals Downloaded from http://www-128.ibm.com/developerworks/web/library/us-portal/.
Free Microsoft Office Information Bridge Framework Donwloaded from htttp://www.microsoft.com/industry/government/InformationBridge.mspx.
Clarifying Search; A User-Interface Framework for Text Searches Downloaded from http://www.dlib.org/dlib/january97/retrieval/01shneiderman.html.
"Componentized Architecture", AgileTek. http://www.agiletek.com/agileplus#CompArchitecture. Last accessed Jan. 5, 2006, 2 pages.
"DTS Programming :Creating the Custom Task Framework." http://msdn.microsoft.com/library/default.asp?url=/library/en-us/dtsprog/dtspcusttskc_3hwr.asp. Last accessed Jan. 5, 2006, 1 page.
"Our Intelligent Agents." http://www.korns.com/technology.htm. Last accessed Jan. 5, 2006, 4 pages.
"TAEMS: A Framework for Task Analysis, Environment Modeling, and Simulation," Multi-Agent Systems Lab. http://dis.cs.umass.edu/research/taems/. Last accessed Jan. 5, 2006, 3 pages.
"Technical Forum : Machine Intelligence and the Turing Test," IBM Sysytems Journal, 2002, pp. 524-539, vol. 41, No. 3.
Chepegin, et al. "CHIME: Service-Oriented Framework for Adaptive Web-Based Systems," in Proceedings of Dutch National Conference InfWet, Eindhoven, The Netherlands, Nov. 20, 2003, pp. 29-36.
Conlan, et al. "Applying Adaptive Hypermedia Techniques to Semantic Web Service Composition," in Proceedings of AH 2003 : Workshop on Adaptive Hypermedia and Adaptive Web Based Systems, 2003, pp. 53-62.
Ernst, et al. "A Task Framework for the Web Interface W2H", Bioinformatics, 2003, pp. 278-282, vol. 19, No. 2, Oxford University Press.
Esposito. "Browser Helper Objects: The Browser the Way You Want It." Microsoft Corporation, Jan. 1999, 12 pages.
Google Toolbar; Revision History; http://www.google.com/support/toolbar/bin/static.py?page=version_info.html ; Dec. 11, 2000.
Hochberg, et al. "A Flexible Framework for Developing Mixed-Initiative Dialog Systems," in Association for Computational Linguistics, Proceedings of the Third SIGdial Workshop on Discourse and Dialogue, Philadelphia, Jul. 2002, pp. 60-63.
International Search Report dated Mar. 29, 2007, mailed Mar. 30, 2007, for International Application No. US2006/044418, 3 pages.
Lieberman, et al. "Instructible Agents : Software that just Keeps Getting Better," IBM Systems Journal, 1996, pp. 539-556, vol. 35, Nos. 3&4.
Liu, et al. "GOOSE: A Goal-Oriented Search Engine with Commonsense," Adaptive Hypermedia and Adaptive Web Based Systems Second International Conference, AH 2002, Malaga, Spain, May 29-31, 2002, Lecture Notes in Computer Science, pp. 253-263, No. 2347.
PESHKIN. "Research Statement." http://people.csail.mit.edu/pesha/my_res.pdf. Last accessed Jan. 5, 2006, 2 pages.
OA Dated Jun. 30, 2008 for U.S. Appl. No. 11/270,407, 33 pages.
OA Dated May 13, 2008 for U.S. Appl. No. 11/294,265, 27 pages.
OA Dated Jun. 16, 2008 for U.S. Appl. No. 11/270,393, 21 pages.
U.S. Final Office Action cited in U.S. Appl. No. 11/294,265 on Dec. 16, 2009.
U.S. Final Office Action cited in U.S. Appl. No. 11/294,581 mailed Dec. 30, 2009.
AdWords Reference Guide, *Google*, 114 pages (Nov. 30, 2004).
U.S. Non-Final Office Action cited in U.S. Appl. No. 11/246,847 mailed Oct. 18, 2006.
U.S. Final Office Action cited in U.S. Appl. No. 11/246,847 mailed Apr. 11, 2007.
U.S. Non-Final Office Action cited in U.S. Appl. No. 11/270,393 mailed Dec. 19, 2006.
U.S. Final Office Action cited in U.S. Appl. No. 11/270,393 mailed Jun. 4, 2007.
U.S. Non-Final Office Action cited in U.S. Appl. No. 11/270,393 mailed Nov. 20, 2007.
U.S. Non-Final Office Action cited in U.S. Appl. No. 11/270,393 mailed Mar. 2, 2009.
U.S. Final Office Action cited in U.S. Appl. No. 11/270,407 mailed Jan. 2, 2009.
U.S. Non-Final Office Action cited in U.S. Appl. No. 11/290,076 mailed Feb. 14, 2008.
U.S. Final Office Action cited in U.S. Appl. No. 11/290,076 mailed Sep. 19, 2008.
U.S. Non-Final Office Action cited in U.S. Appl. No. 11/290,076 mailed Jun. 9, 2009.
U.S. Non-Final Office Action cited in U.S. Appl. No. 11/294,262 mailed Nov. 28, 2007.
U.S. Final Office Action cited in U.S. Appl. No. 11/294,262 mailed May 13, 2008.
U.S. Non-Final Office Action cited in U.S. Appl. No. 11/294,262 mailed Sep. 22, 2008.
U.S. Final Office Action cited in U.S. Appl. No. 11/294,262 mailed Mar. 12, 2009.
U.S. Non-Final Office Action cited in U.S. Appl. No. 11/294,262 mailed Aug. 21, 2009.
U.S. Non-Final Office Action cited in U.S. Appl. No. 11/294,265 mailed Nov. 28, 2007.
U.S. Non-Final Office Action cited in U.S. Appl. No. 11/294,265 mailed Nov. 26, 2008.
U.S. Non-Final Office Action cited in U.S. Appl. No. 11/294,265 mailed Jun. 12, 2009.
U.S. Non-Final Office Action cited in U.S. Appl. No. 11/294,581 mailed Nov. 28, 2007.
U.S. Non-Final Office Action cited in U.S. Appl. No. 11/294,581 mailed May 13, 2008.
U.S. Final Office Action cited in U.S. Appl. No. 11/294,581 mailed Feb. 5, 2009.
U.S. Non-Final Office Action cited in U.S. Appl. No. 11/294,581 mailed Jun. 23, 2009.
US Non-Final-Office-Action cited in U.S. Appl. No. 11/294,262 mailed Jul. 19, 2010.
International Search Report mailed Apr. 11, 2007 in Application No. PCT/US2006/043663.
U.S. Final Office Action cited in U.S. Appl. No. 11/294,262 mailed Apr. 1, 2010.
U.S. Non-Final Office Action cited in U.S. Appl. No. 11/294,265 mailed Feb. 23, 2010.
Korns Associates "Our Intelligent Agents", 4 pages, accessible at: http://www.korns.com/technology.htm, last accessed Jan. 5, 2006.
V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.
Esposito, Dino. "Browser Helper Objects:The Browser the Way You Want It. Microsoft Corporation", Jan. 1999, 12 pages.
Usability for component-based portals Downloaded from http://www-128.ibm.com/developerworks/web/library/us-portal/, Jun. 2007.
Free Microsoft Office Information Bridge Framework Donwloaded from http://www.microsoft.com/industry/government/InformationBridge.mspx, Nov. 2005.
Clarifying Search; A User-Interface Framework for Text Searches Downloaded from http://www.dlib.org/dlib/january97/retrieval/01shneiderman.html, Oct. 1997.

* cited by examiner

WIDGET SEARCHING UTILIZING TASK FRAMEWORK

RELATED APPLICATIONS

This application is related to co-pending U.S. patent application Ser. No. 11/270,393, filed Nov. 9, 2005, and entitled, "ADAPTIVE TASK FRAMEWORK", co-pending U.S. patent application Ser. No. 11/270,407, filed Nov. 9, 2005, and entitled, "ADAPTIVE TASK FRAMEWORK", co-pending U.S. patent application Ser. No. 11/290,076, filed Nov. 30, 2005, and entitled, "ADAPTIVE SEMANTIC REASONING ENGINE", and co-pending U.S. patent application Ser. No. 11/294,265, filed Dec. 5, 2005, and entitled, "EMPLOYMENT OF TASK FRAMEWORK FOR ADVERTISING". These applications are incorporated herein by reference.

BACKGROUND

Computers have become an integral part of modern society. They can be found in almost all businesses and homes today, helping to reduce the burdens of repetitive tasks, allowing more time for other more productive activities. Typically, a program or application is created in software that runs on a computer to accomplish the task that was once required to be performed by humans. Thus, applications can be utilized in place of manual labor, often yielding superior results in a much shorter amount of time. The size of these applications have grown exponentially over time and some are quite complex. In order to support more powerful applications, additional computer resources are required such as computational resources and memory. The increases in application sizes and resource utilization have also yielded increased startup times and processing times.

For example, a user may desire to write a quick note to send out to a friend. The user could use a word processing application to accomplish this. However, modern word processing applications are often packed with additional features that allow them to be utilized in many different tasks. They may have spreadsheet interaction capabilities, drawing package attributes, database management tools, format conversion capabilities, advanced math symbology, multiple font selections, advanced text formatting tools, page formatting options, printing preview tools, etc. All of these capabilities might be unnecessary to send a quick note to a friend. The user most likely would prefer launching a small application, typing the short note, and sending it to their friend. If the user has to wait for the entire word processor application to load into the computer, they may decide that it takes too long and not write the note.

As a way to speed up applications, significantly smaller-sized applications called "widgets" were created that allowed a user to accomplish tasks in a much shorter time. These widgets are small purpose-built applications that typically accomplish singular tasks. In general, a widget does not require the same level of system resources to run as a full application does and can be started quickly. Widgets have become very popular, even too popular. Today there appears to be a widget for every task imaginable. Users typically download these widgets to their desktops so that they can quickly find and start them. The "store on the desktop" schema works well when a user has only a few widgets. However, as users download more and more widgets, this schema often causes widgets to overrun a user's desktop. So, eventually users have to organize their widgets in some form of hierarchy such as in folders and databases. And, although they may be stored in an orderly fashion, it is now more difficult to quickly find and start an appropriate widget when a task becomes desirable. This difficulty will continually increase as the number of widgets increases. Since widgets are becoming more popular each day, more and more users will become frustrated with trying to locate and employ their favorite widgets.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to search engines, and more particularly to systems and methods for enhancing searching and/or slot filling of widgets. A task framework and an adaptive semantic reasoning engine are combined to provide a scalable mechanism for dealing with extremely large numbers of widgets, allowing users to both find a widget and automatically fill-in whatever functionality is available on the widget. Calling applications are employed to obtain task information from each widget. The calling application also receives user queries that can be resolved by a widget. A task reasoning process based on an adaptive semantic reasoning engine utilizes the task information to select a widget best suited to respond to a user's query. The task reasoning process can also be employed to determine "best-guess" slot filling of the selected widget. The calling application can then invoke the selected widget and, if available, fill appropriate slots with information to facilitate user interaction with the selected widget.

Instances can be client-side and/or server-side based. This allows, for example, Web browser based widget searching of widgets on a remote server and the like. Other instances incorporate user feedback with regard to the appropriateness of the selected widget and/or the slot filling. The user feedback can then be utilized by the task reasoning process to improve subsequent widget selections for that user. Thus, substantial improvements in quickly locating appropriate widgets and filling in information automatically allows users to effortlessly employ widgets to find related information, foregoing the previous inherent difficulties of searching through large numbers of widgets.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
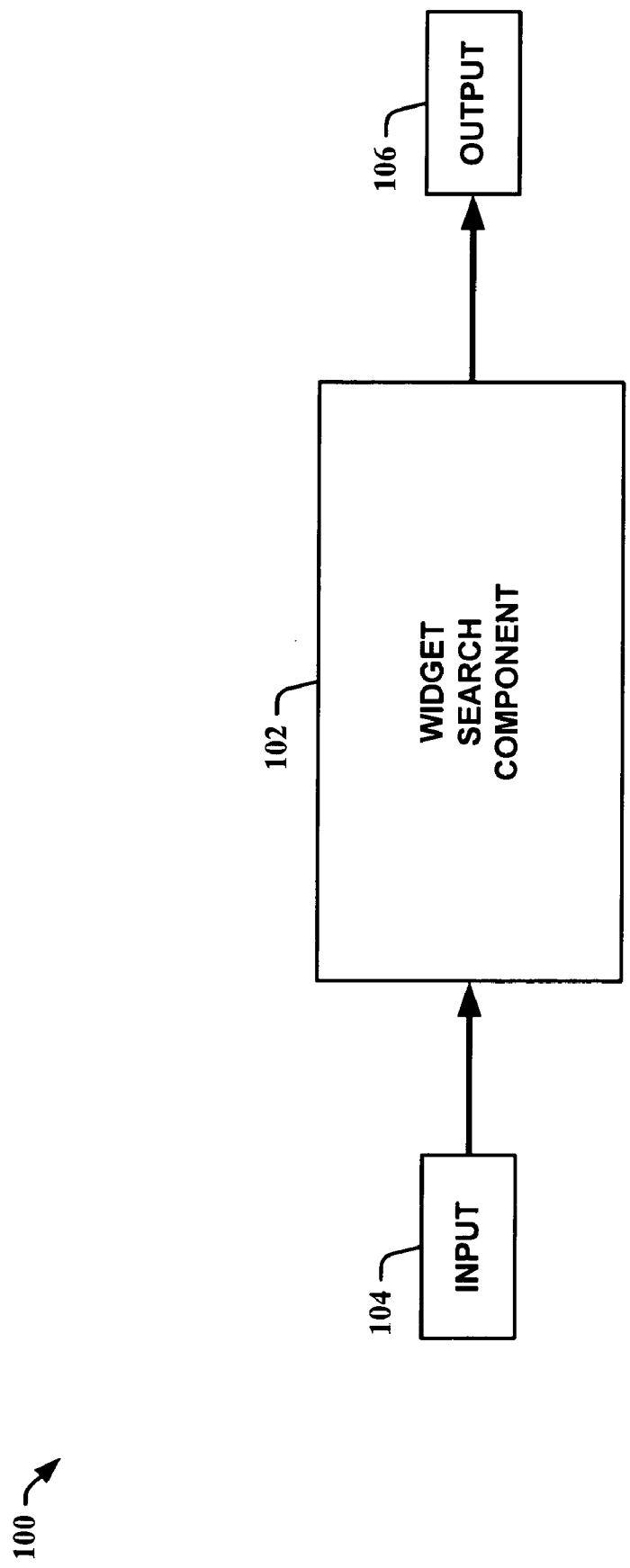
FIG. 1 is a block diagram of a widget search system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

"Widgets" are small programs that perform very specific functions and can reside on a client and/or a server. They can be used, for example, to show the time, find the cheapest gas near a particular zip code, show the weather forecast near a city, find flights from a particular airline, show sports scores, or compare prices on a particular product or service and the like. The number of applications of widgets is virtually unlimited, both on the client and the server. Thus, with the proliferation of widgets, a larger problem is manifested: finding a particular widget when the user wants it and allowing a user to execute pieces of functionality from the widget directly using natural language queries as an input mechanism. Thus, having an efficient mechanism for searching for widgets is critical. Additionally, there currently is no way to generically pass parameter information to a widget that allows it to be driven externally to allow a user to request, for example, "weather in Seattle."

ADAPTIVE TASK FRAMEWORK mechanisms (U.S. patent application Ser. Nos. 11/270,393 and 11/270,407) and ADAPTIVE SEMANTIC REASONING ENGINE mechanisms (U.S. patent application Ser. No. 11/290,076) provide approaches that facilitate modeling advanced semantic constructs such as "tasks" whereby a task is something that users want to do and may or may not take parameters as input. These framework mechanisms allow a system to respond to users' behavior and improve the ranking and slot-filling models, thus, enhancing the user experience over time. Instances of the systems and methods herein provide mechanisms that reason over widgets and perform searching by utilizing the infrastructure provided by the ADAPTIVE TASK FRAMEWORK and ADAPTIVE SEMANTIC REASONING ENGINE mechanisms. This combination of approaches provides leveraging of the work done for semantic processing with a new paradigm of widgets that, for example, allows a user to enter a query such as "weather in Seattle," find the appropriate widget (e.g., the weather widget), pass information to the widget (e.g., City="Seattle"), and then show the widget with Seattle's forecast already loaded.

In FIG. 1, a block diagram of a widget search system 100 in accordance with an aspect of an embodiment is shown. The widget search system 100 is comprised of a widget search component 102 that receives an input 104 and provides an output 106. The input 104 can include, but is not limited to, a query that can be responded to via a widget and/or parametric task data from various widgets to facilitate widget selection. The widget search component 102 employs widget parametric task data in its task models to facilitate in selecting appropriate widgets for a given user query. The task data can include, but is not limited to, general task capabilities, types of acceptable inputs (i.e., "slots"), and/or information that can facilitate the widget search component 102 to properly select the widget and/or fill slots when appropriate. The query can be received by the widget search component 102 directly from a user and/or via an intermediate means such as, for example, a Web browser. This flexibility allows the widget search system 100 to reside client-side and/or server-side to support searching of widgets located at the client and/or at the server. The query itself can be, but is not required to be, a natural language query and the like. This allows a simplistic user interface for accepting query inputs. The input 104 is modality independent and can include, but is not limited to, audible inputs, keyboard inputs, and/or mouse inputs and the like. One skilled in the art can appreciate that as technology develops additional input techniques will also be created and are within the scope of the systems and methods herein.

The widget search component 102 employs widget parametric task data to select an appropriate widget based on a given query. The query itself can contain "slot data" that the widget search component 102 processes to determine a "best-guess" slot match for the data. This enables the widget search component 102 to provide information that can be utilized to pre-fill slots for a selected widget, reducing the amount of data required to be entered by a user for the selected widget. If a user desires to know "how many Yen are in a $100 dollars," the widget search component 102 can select a currency converter widget and send slot data matched to a dollar slot for the widget. The output 106 can then include, but is not limited to, widget selections, widget slot data, and/or widget invoking/calling commands and the like. Thus, the output 106 can be utilized to identify an appropriate widget based on a given query and/or to facilitate in invoking the appropriate widget with or without slots being filled and the like.

The widget search component 102 employs the Task Framework and adaptive semantic reasoning engine to facilitate mapping of queries to an appropriate task. The Task Framework provides a schema for having a widget specify what information can be utilized to find it and what parameter values it can accept. The appropriate task can then be matched to a widget given the widget's task data by an adaptive semantic reasoning engine. The combination of these two mechanisms allows the widget search system 100 to substantially outperform existing widget search functions, both in scalability and accuracy. It also allows a user to not only search for a specific widget, but also to merely ask questions and have the appropriate widget automatically provided to them. For example, a user can ask "where is the cheapest local gas," and the widget search system 100 can provide a gas price widget with the user's area code pre-filled so that the gas price widget displays local gas prices when it is automatically invoked.

Figure 2:
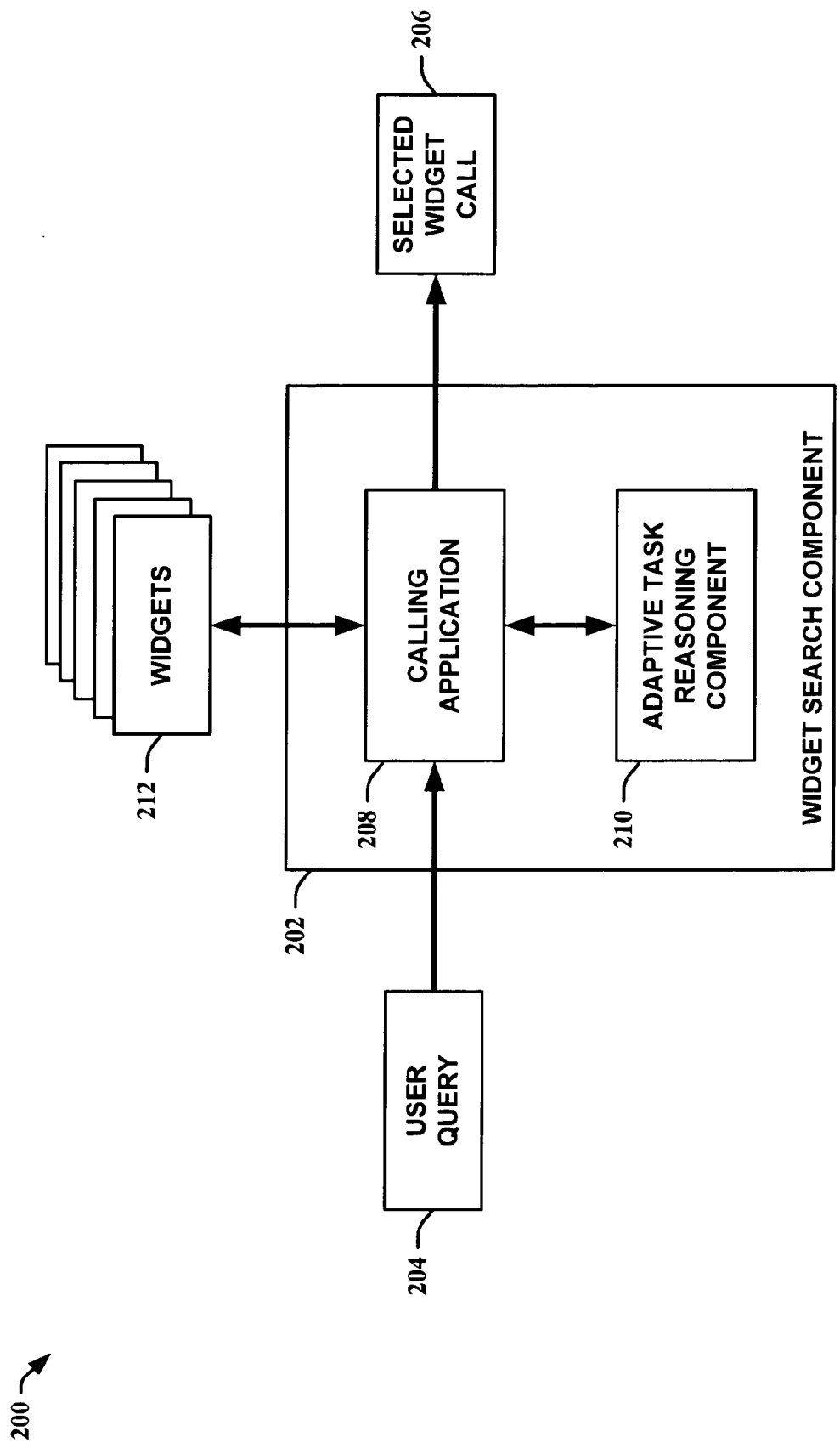
FIG. 2 is another block diagram of a widget search system in accordance with an aspect of an embodiment.

Turning to FIG. 2, another block diagram of a widget search system 200 in accordance with an aspect of an embodiment is illustrated. The widget search system 200 is comprised of a widget search component 202 that receives a user query 204 and provides a selected widget call 206. The widget search component 202 is comprised of a calling application 208 and an adaptive task reasoning component 210. The adaptive task reasoning component 210 can also be referred to as a "semantic reasoning component" that employs aspects from ADAPTIVE SEMANTIC REASONING ENGINE (see, U.S. patent application Ser. No. 11/290,076). The calling application 208 interfaces with widgets 212. The calling application 208 typically interfaces with widgets 212 to initially obtain widget task data that the calling application 208 then passes to the adaptive task reasoning component 210 to facilitate in widget selection. When a user query 204 is received, the calling application 208 passes the user query 204 to the adaptive task reasoning component 210. The calling application 208 can include, but is not limited to, applications such as search engines and/or toolbars and the like. The adaptive task reasoning component 210 selects an appropriate widget to respond to the user query 204. The adaptive task reasoning component 210 employs the widget task data to facilitate selection of the widget and/or to determine slot filling for the widget. The selected widget information and/or slot fill information is then passed to the calling application 208. In this instance the calling application 208 provides a selected widget call 206 which can include slot fill information when applicable. Although the selected widget call 206 is illustrated apart from the widgets 212 for clarification, the selected widget call 206 is sent to the appropriate widget which can be one of the widgets 212.

Figure 3:
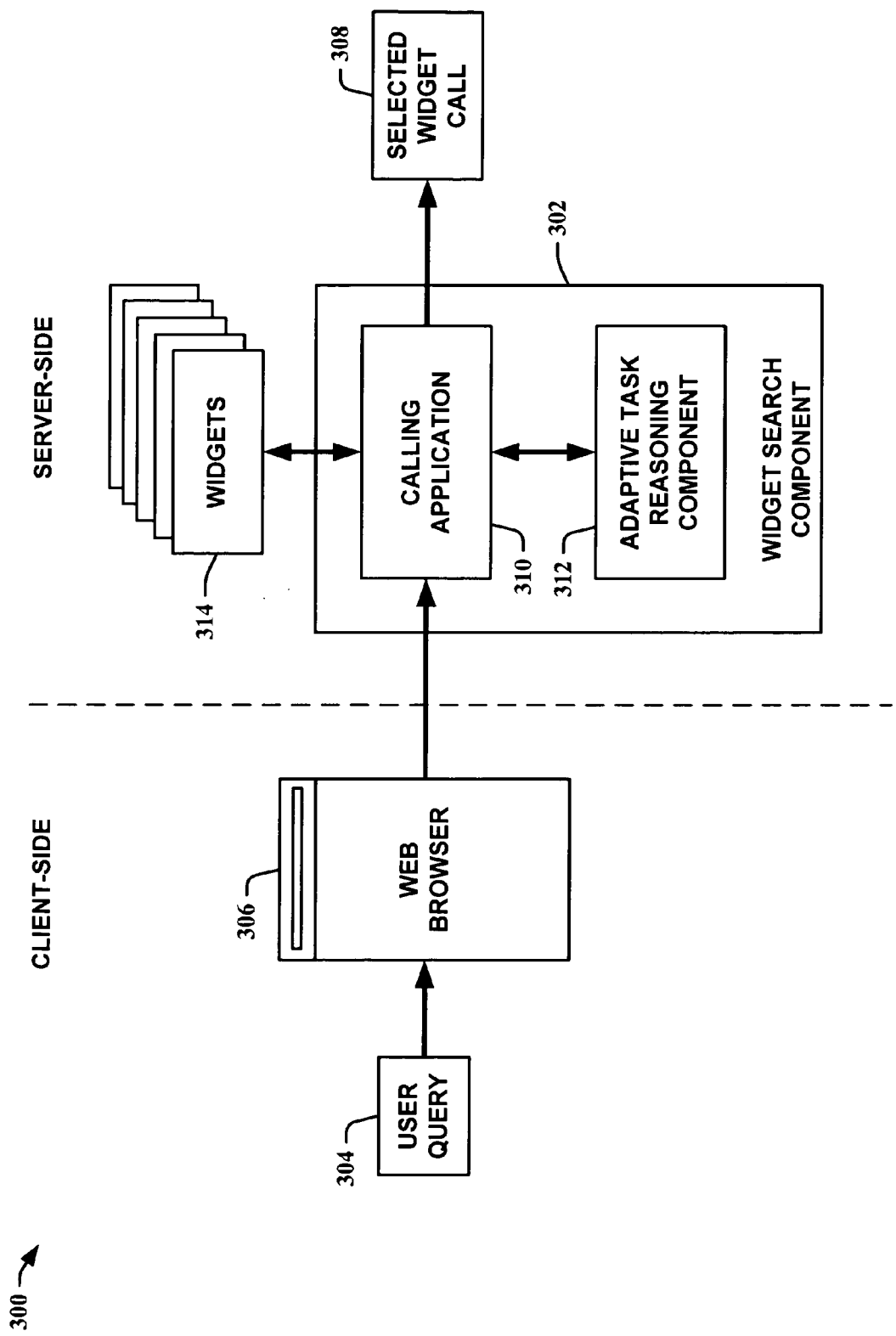
FIG. 3 is a block diagram of a browser-based widget search system in accordance with an aspect of an embodiment.

Referring to FIG. 3, a block diagram of a browser-based widget search system 300 in accordance with an aspect of an embodiment is depicted. The widget search system 300 is comprised of a widget search component 302 that receives a user query 304 via a Web browser 306 and provides a selected widget call 308. The widget search component 302 is comprised of a calling application 310 and an adaptive task reasoning component 312. The adaptive task reasoning component 312 can also be referred to as an adaptive "semantic reasoning component" that employs aspects from ADAPTIVE SEMANTIC REASONING ENGINE (see, U.S. patent application Ser. No. 11/290,076). The calling application 310 interfaces with widgets 314. The calling application 310 can include, but is not limited to, applications such as search engines and/or toolbars and the like. In this instance, the Web browser 306 resides on the client-side and is utilized to interface with a user to accept the user query 304. This provides a user interface on the client-side while the widgets 314 reside on the server-side. One skilled in the art can appreciate that the widgets 314 can also reside solely on the client-side or even on both the client-side and server-side and, thus, these embodiments are also within the scope of the systems and methods herein. Likewise, the widget search component 302 can reside on the client-side while the widgets 314 reside on the client-side and/or the server side. The Web browser 306 can be utilized to accept the user query 304 and/or display a selected widget to the user. The Web browser 306 passes the user query 304 to the calling application 310. In other instances a Web browser (i.e., intermediate application) is not necessary, and the user query 304 can pass directly to the calling application 310.

The calling application 310 typically interfaces with widgets 314 to initially obtain widget task data that the calling application 310 then passes to the adaptive task reasoning component 312 to facilitate in widget selection. When a user query 304 is received from the Web browser 306, the calling application 310 passes the user query 304 to the adaptive task reasoning component 312. The adaptive task reasoning component 312 selects an appropriate widget to respond to the user query 304. The adaptive task reasoning component 312 employs the widget task data to facilitate selection of the widget and/or to determine slot filling for the widget. The selected widget information and/or slot fill information is then passed to the calling application 310. In this instance, the calling application 310 provides a selected widget call 308 which can include slot fill information when applicable. Although the selected widget call 308 is illustrated apart from the widgets 314 for clarification, the selected widget call 308 is sent to the appropriate widget which can be one of the widgets 314.

Figure 4:
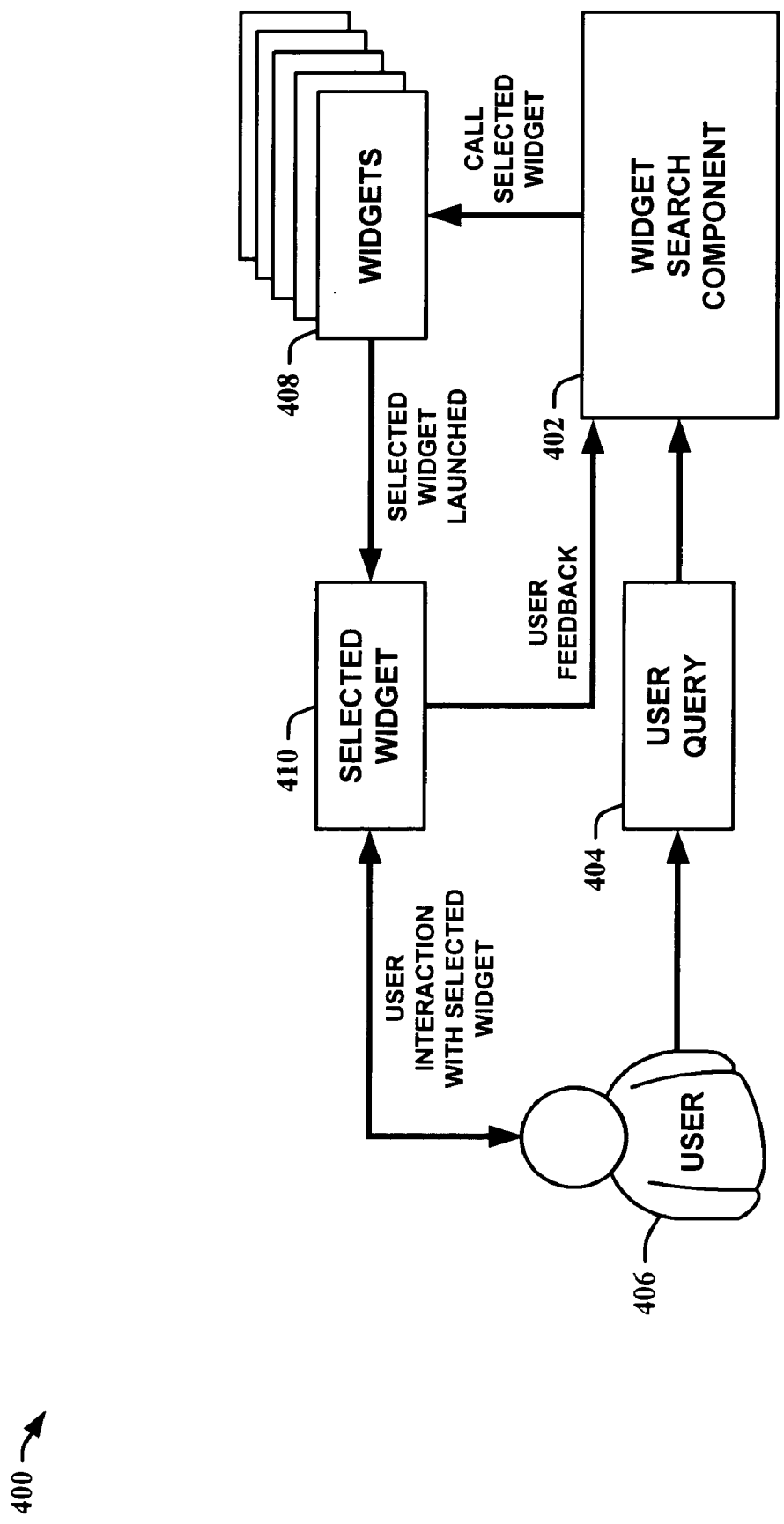
FIG. 4 is a block diagram of a widget search system with user feedback in accordance with an aspect of an embodiment.

Looking at FIG. 4, a block diagram of a widget search system 400 with user feedback in accordance with an aspect of an embodiment is shown. The widget search system 400 is comprised of a widget search component 402. The widget search component 402 receives a user query 404 from a user 406 and provides a call selected widget to widgets 408. A selected widget 410 is then launched and displayed to the user 406. The user 406 then interfaces with the selected widget 410. The selected widget 410 can then relay various aspects of the interaction with the user 406 to the widget search component 420 as user feedback relating to the widget selection process. The widget search component 402 can utilize aspects of an ADAPTIVE SEMANTIC REASONING ENGINE (see, U.S. patent application Ser. No. 11/294,265) to facilitate performance improvements on the widget selection process and/or the widget slot matching/filling process. The adaptive reasoning engine can employ statistical learning models (e.g., Hidden Markov Models (HMM) for semantic slot-filling, Naïve Bayesian models for Information Retrieval (IR), Max Entropy Minimum Divergence (MEMD) for ranking and/or query and context to asset mapping).

Thus, with the proliferation of widgets (i.e., small, often singular purposed applications) on both server and client sides, finding and executing widget functionality becomes substantially more problematic without utilization of the above systems. For users running tens or hundreds of client-side widgets, managing the widgets becomes increasingly more difficult. Similarly, in server-side widget scenarios, the number of widgets is potentially huge making it more difficult for users to find the appropriate widget and perform a task. The Task Framework/adaptive semantic reason engine-based systems and methods provide scalable mechanisms for dealing with extremely large numbers of widgets, allowing users to both find a widget and execute whatever functionality is available on the widget. For example, if a user enters a request for "find flights from Boston to Seattle" the Task Framework/adaptive semantic reason engine-based systems and methods can first find the appropriate widgets (e.g., a flight finding or vacation booking widgets) and can also allow any parametric or slot information to be filled. This ability increases the value of widget searching systems that employ the systems and methods herein and would yield a competitive advantage over other searching engines.

Widgets

Client-Side Widgets

Figure 5:
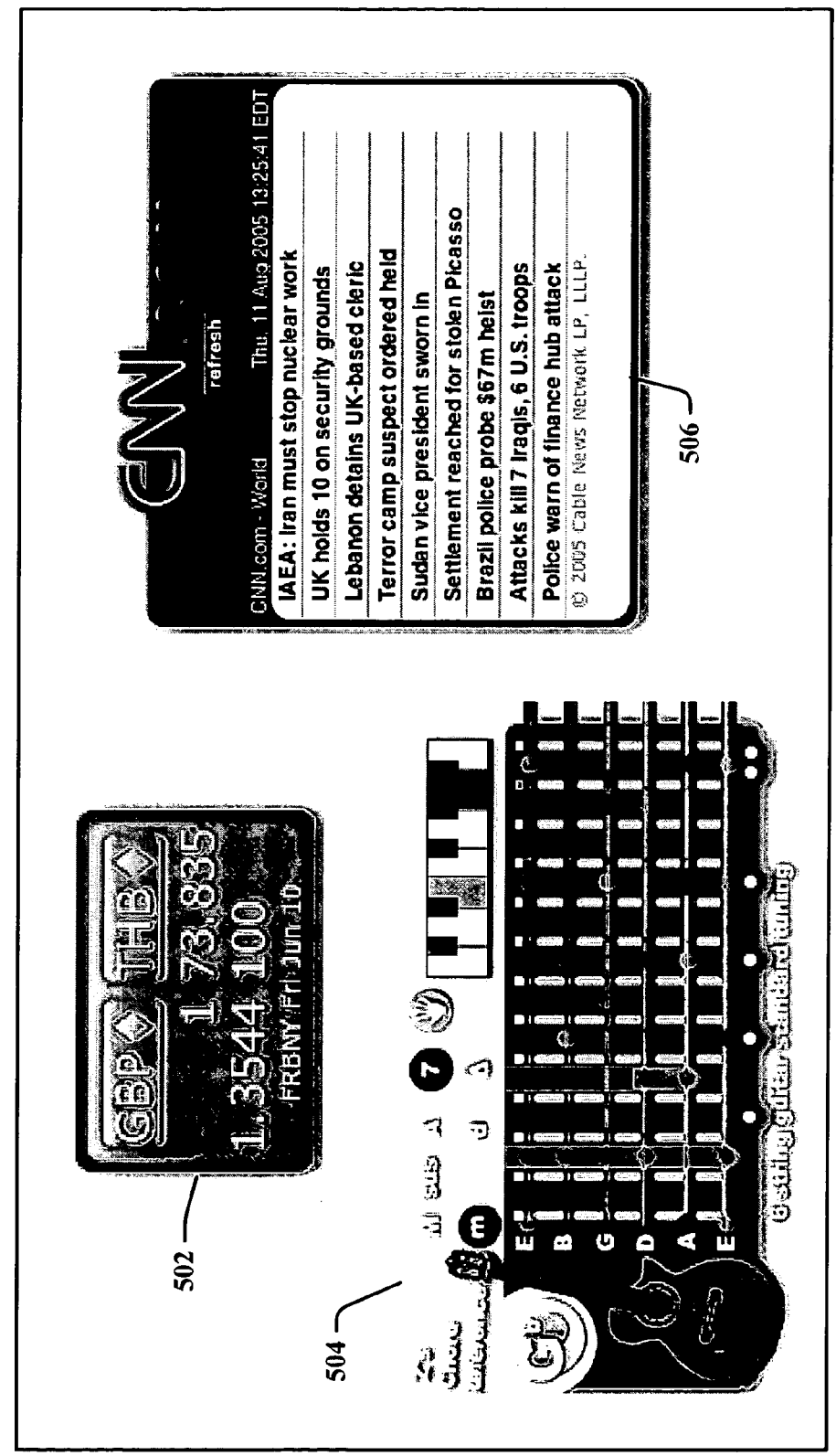
FIG. 5 is an illustration of examples of widgets in accordance with an aspect of an embodiment.

Users can download widgets easily from Internet Web sites to perform many different functions. In FIG. 5, an illustration 500 of examples of widgets 502-506 in accordance with an aspect of an embodiment is shown. The illustration 500 shows a few examples of widgets that are freely available to do things like compare current exchange rates using the Currency Comparer 502, find chords using the Chord Finder 504, or just check the news from a particular source using the CNN Widget 506. Typically, after downloading the widgets, the widgets exist like any other application and can be shown on the desktop much in the way a regular-sized application is shown. Of course, if the user has tens or hundreds of widgets running, the desktop will quickly become cluttered and unmanageable. Thus, users attempt to file the widgets in some logical manner. However, this only slightly decreases the time it takes a user to hunt down an appropriate widget when they need it to perform a task.

Server-Side Widgets

Figure 6:
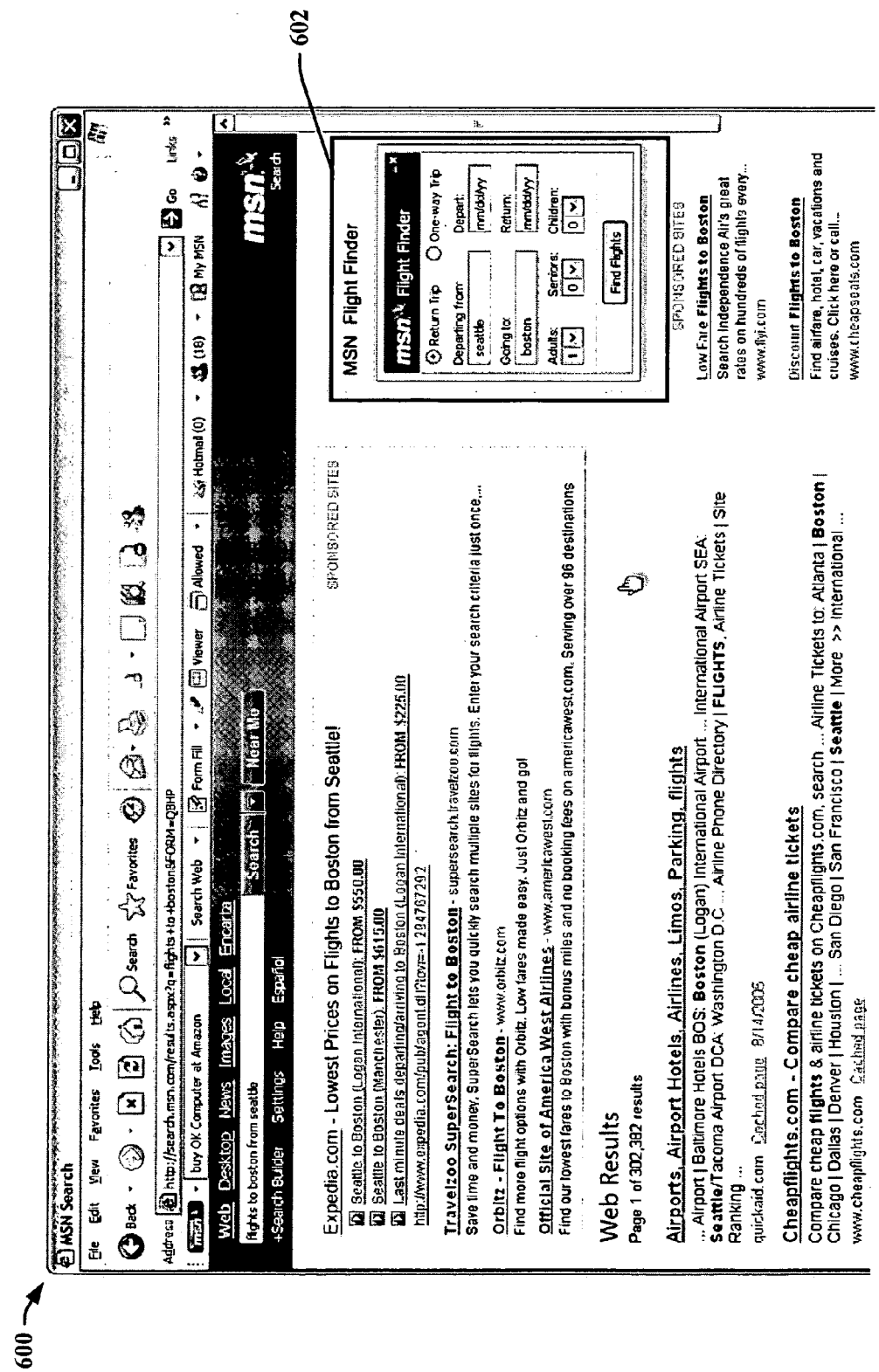
FIG. 6 is an illustration of an example of a browser-based widget in accordance with an aspect of an embodiment.

These types of widgets contain functionality that is executed on a server without requiring that a user download any client-side application code. For example, a search engine may wish to provide a flight finding widget to facilitate finding cheap airfare where the functionality for finding flights resides on the server, and the client is only used to display the results via standard HTML (hypertext markup language) conventions. FIG. 6 depicts an illustration 600 of such an example of a browser-based widget 602. Having a broad range of server-side widgets allows users to have access to functionality they may only use once or twice with a minimum of effort. Of course, the problem remains that as the number of server-side widgets increases, finding the appropriate widget(s) at the appropriate time becomes more and more of a challenge.

Task Framework Overview

The Task Framework is described in depth in ADAPTIVE TASK FRAMEWORK (U.S. patent application Ser. Nos. 11/270,393 and 11/270,407) and is briefly described here. The central construct is the notion of a "Task" where a task provides various metadata and slot information to describe an action. The "FlightFinder" task below illustrates some of the elements that might be seen in a task:

```
<Task Name="FlightFinder">
    <Keywords>cheap;tickets;flights;flight;vacations</Keywords>
    <Slots>
        <Slot name="Arrival City" type="CITY">
            <PreIndicators>to, going into</PreIndicators>
            <PostIndicators>arrival city</PostIndicators>
        </Slot>
        <Slot name="Departure City" type="CITY">
            <PreIndicators>from, originating in</PreIndicators>
            <PostIndicators>departure city</PostIndicators>
        </Slot>
        <Slot name="Arrival Time" type="TIME">
```

-continued

```
            <PreIndicators>arriving at</PreIndicators>
            <PostIndicators>arrival time</PostIndicators>
        </Slot>
        <Slot name=" Departure Time" type= "TIME">
            <PreIndicators>leaving at</PreIndicators>
            <PostIndicators>departure time</PostIndicators>
        </Slot>
        <Slot name="Adults" type= "INTEGER">
            <PreIndicators> </PreIndicators>
            <PostIndicators> adult, adults</PostIndicators>
        </Slot>
        <Slot name="Seniors" type= "INTEGER">
            <PreIndicators> </PreIndicators>
            <PostIndicators>senior,seniors</PostIndicators>
        </Slot>
        <Slot name="Children" type= "INTEGER">
            <PreIndicators> </PreIndicators>
            <PostIndicators>children,child,kid,kids</PostIndicators>
        </Slot>
    </Slots>
</Task>
```

Where:
Keywords are terms that might be used to surface a Task.
Slots are parameter values that may or may not be filled by the user Query.
They are uniquely specified by their Name and Type.
PreIndicators are words that might disambiguate slots by occurring before a value.
"to Boston" would prefer the "Arrival City" slot over the "Departure City" slot even though Boston maps to CITY and can be a value for either slot.
PostIndicators are words that might disambiguate slots by occurring before a value.
"from Boston" would prefer the "Departure City" slot over the "Arrival City" slot even though Boston maps to CITY and can be a value for either slot.

Given this schema, the following example queries can be handled:

"I want a flight from Boston with a 8:30 PM departure time with 2 adults and 1 child."

"Buy a ticket from Seattle to New York leaving at 5:15 PM."

Additionally, the Task Framework and adaptive semantic reasoning engine provide mechanisms to learn from user behavior such that if users start entering queries such as "departing Boston for Seattle" to mean "Departure City"="Boston" and "Arrival City"="Seattle" the system automatically learns the pattern "departing <Departure City> for <Arrival City>" without needing to explicitly add new Pre or Post indicators to the Task definition. A system implementing the Task Framework/adaptive semantic reasoning engine is responsible for taking an input query, finding a set of likely Tasks given the input query, filling out slot values given a Task and the input query, retrieving the most likely Tasks with the most likely slot values, and/or optionally receiving feedback data to learn from the user feedback.

Task Framework-Based Widget Searching/Executing

Widgets are incredibly useful at encapsulating a piece of functionality within a pseudo-application. However, the number of potential widgets is incredibly large. Thus, finding an appropriate widget at an appropriate time becomes a substantial problem with existing solutions. However, the Task Framework provides an approach for modeling widgets as tasks that facilitate both retrieval of the widget (e.g., finding the appropriate widget given a query such as "what is the exchange rate of USD to GBP?") and slot-filling (e.g., Currency1="USD" and Currency2="GBP"). Moreover, instances of the systems and methods herein have the added benefit of scaling to large numbers of tasks easily.

Each widget is responsible for exposing metadata and methods used by the Task Framework. For example, the FlightFinder widget would expose the data shown for the Task="FlightFinder" shown above. This allows the retrieval engine to retrieve the proper widget if any of the words in the <Keywords> tag (e.g., "cheap," "tickets," "flights," "flight," "vacations") occur. It allows the widget to be called with any of the slot parameters (e.g., "Arrival City" . . . "Adults" . . . "Children") specified as well. Thus, when the widget is created, the task metadata must be created with it through a well-defined task API. By adhering to a strict task API, a widget is capable of being found and having its slots filled using a centralized Task Reasoning entity (i.e., adaptive semantic reasoning engine). This ensures consistency of the ranking algorithms, and the ability to find the best task at the appropriate time. Optionally, the widget can pass user feedback to the system to improve both the retrieval and slot-filling models (e.g., a user who enters the query "I want 2 tickets departing Boston for Seattle" would end up setting Adults="2," Departure City="Boston," and Arrival City="Seattle" and that feedback can be used to map "tickets"→FlightFinder and "departure"→"Departure City" and the like.

Figure 7:
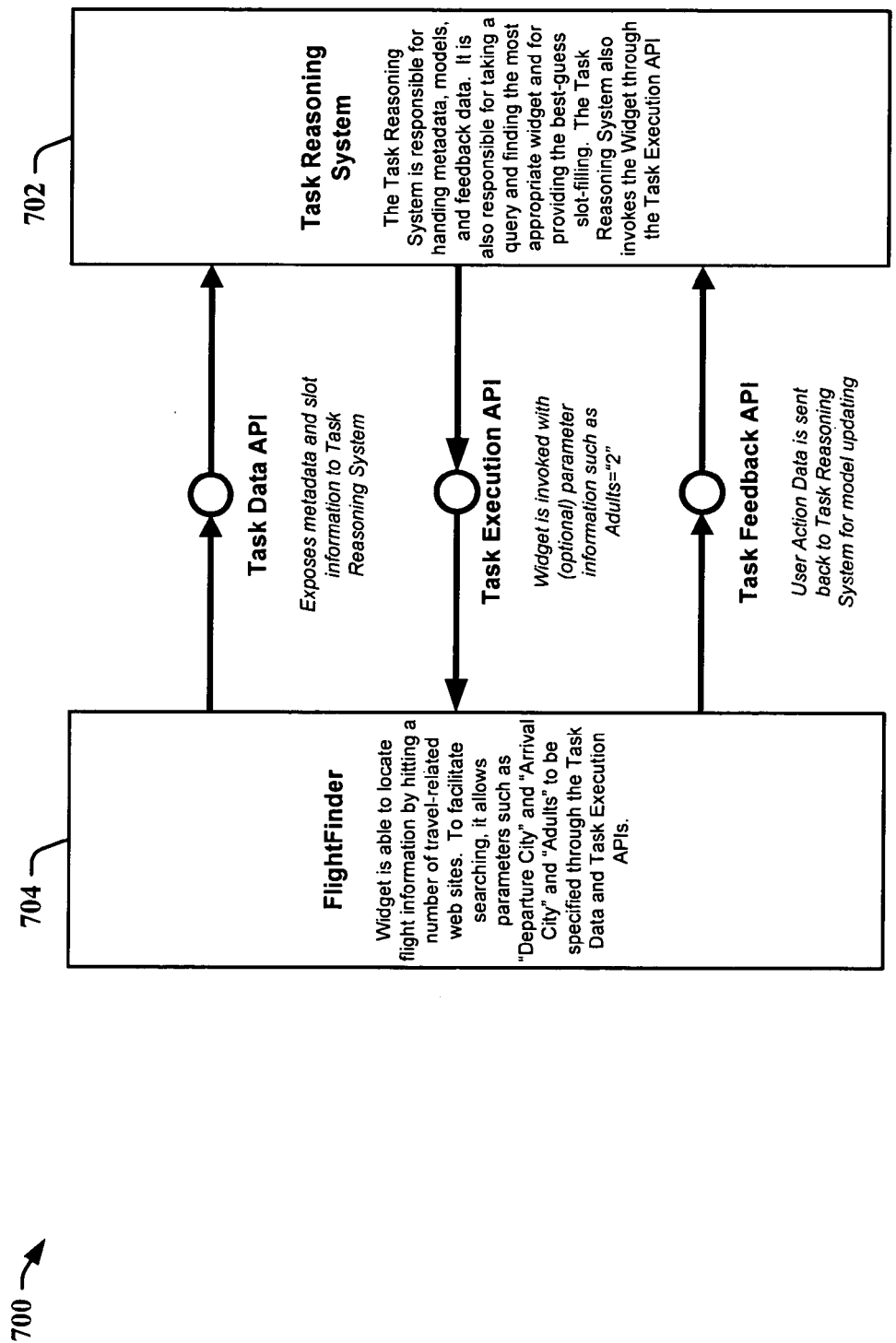
FIG. 7 is an illustrative example of data flow between a task reasoning system and a widget in accordance with an aspect of an embodiment.
Figure 8:
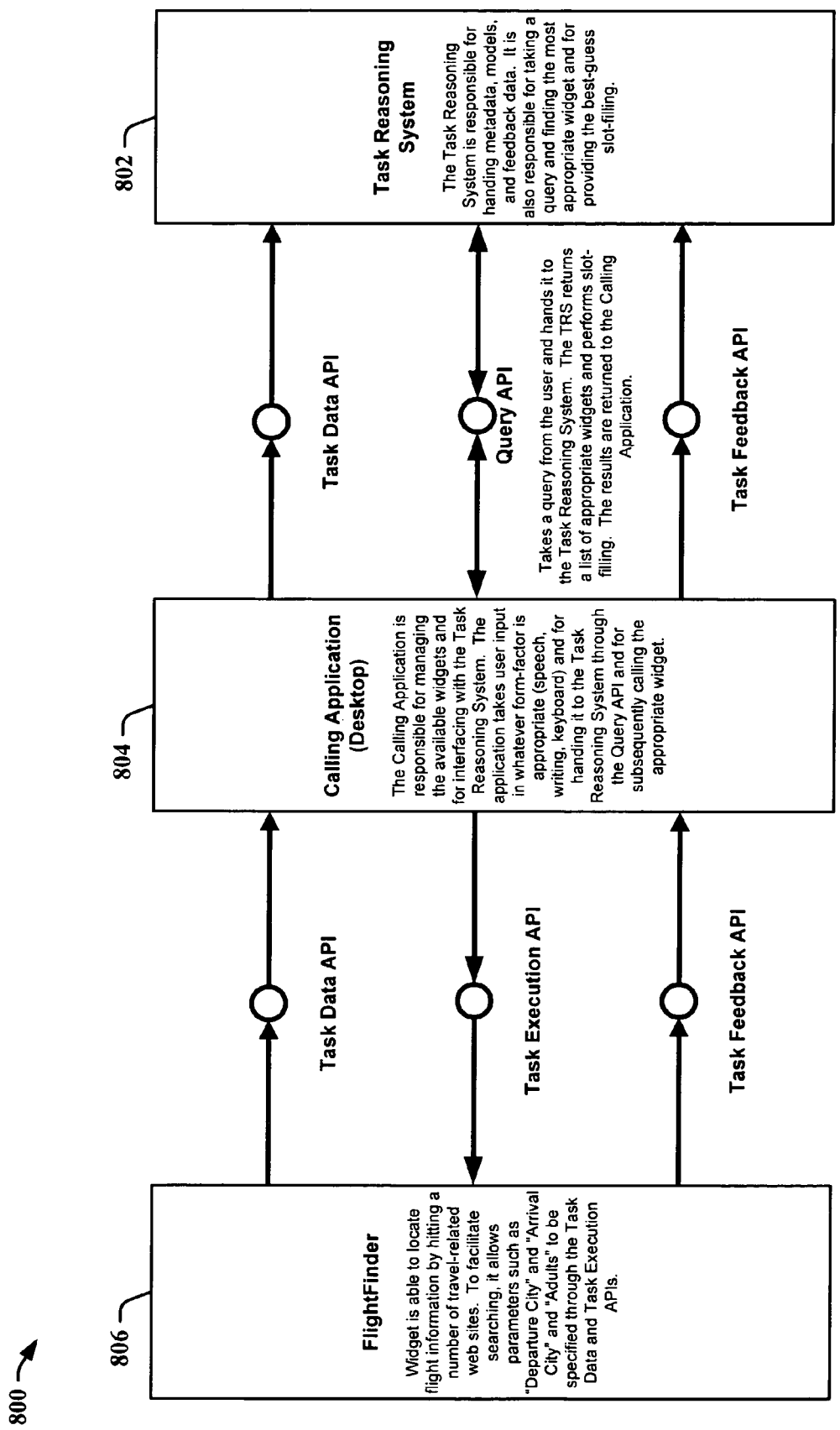
FIG. 8 is an illustrative example of data flow between a task reasoning system, a calling application, and a widget in accordance with an aspect of an embodiment.
Figure 9:
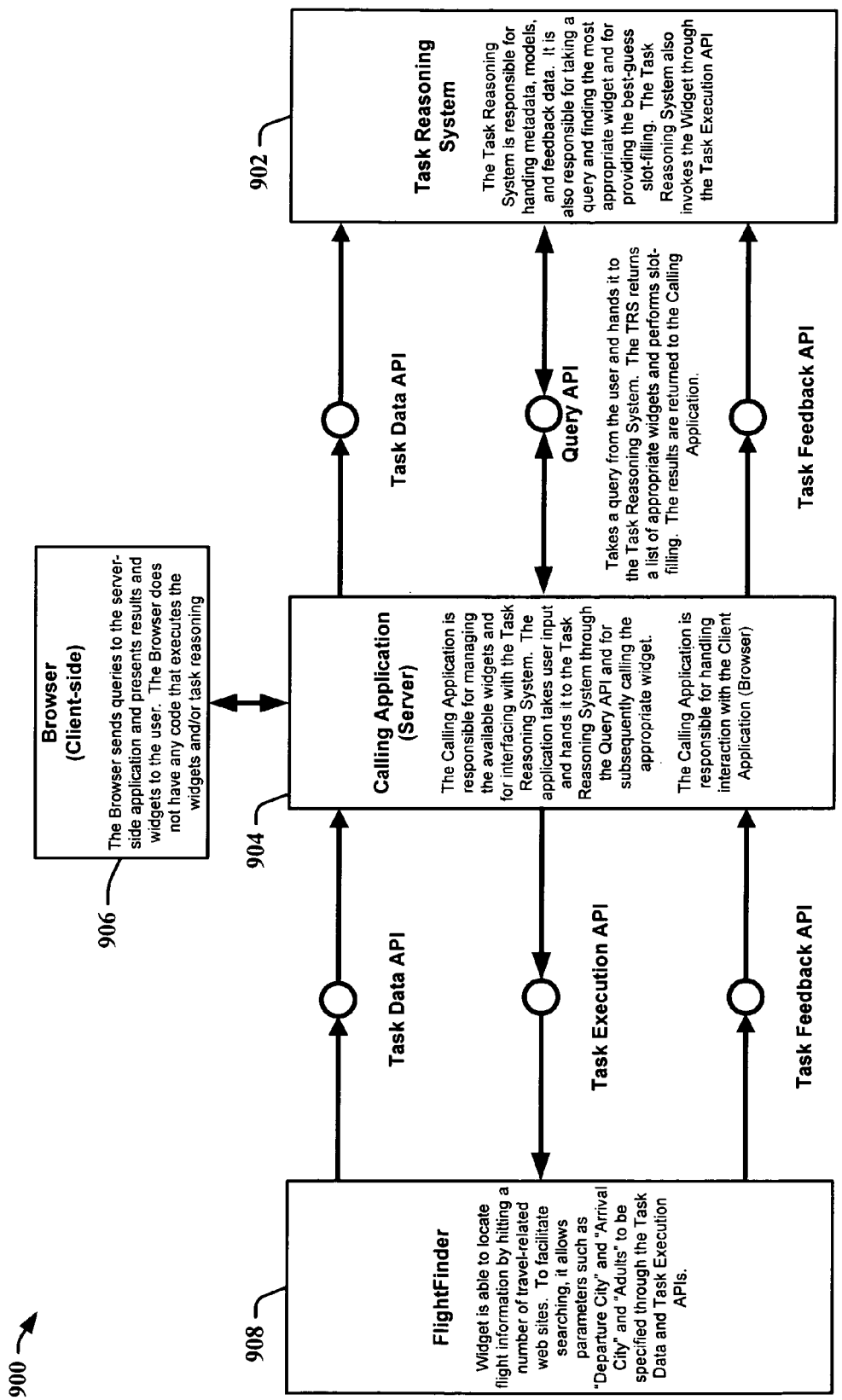
FIG. 9 is an illustrative example of data flow between a task reasoning system, a calling application, a browser, and a widget in accordance with an aspect of an embodiment.

FIG. 7 illustrates an example data flow 700 between a task reasoning system 702 and a widget 704. FIG. 8 illustrates an example data flow 800 between a task reasoning system 802, a calling application 804, and a widget 806. FIG. 9 illustrates an example data flow 900 between a task reasoning system 902, a calling application 904, a browser 906, and a widget 908. One instance of a Task Framework/adaptive semantic reasoning engine-based widget searching system can function as follows:

1. The calling application manages the widgets and the Task Reasoning System (TRS).
2. Each widget is queried for the Task Interface and Metadata which seeds the TRS models.
3. A query is entered into the calling application.
4. The query is then passed to the TRS, and the most appropriate widget(s) is(are) found. Where applicable, slots are filled in.
5. The results are then passed to the application. Where applicable, the user is presented with the results and makes a selection (some instances present only a single widget selection to the user, and, thus, is automatically invoked per step 6).
6. The widget is selected and invoked with the slot information (if applicable).

In cases where additional information is required or confirmation is needed, the widget is responsible for that process.

7. The user interacts with the widget directly.
8. Upon completion of the task, optional feedback data can be passed from the widget to the application and the TRS.

The server-side widget scenario is almost identical except that the front-end is contained in a Web browser.

Figure 10:
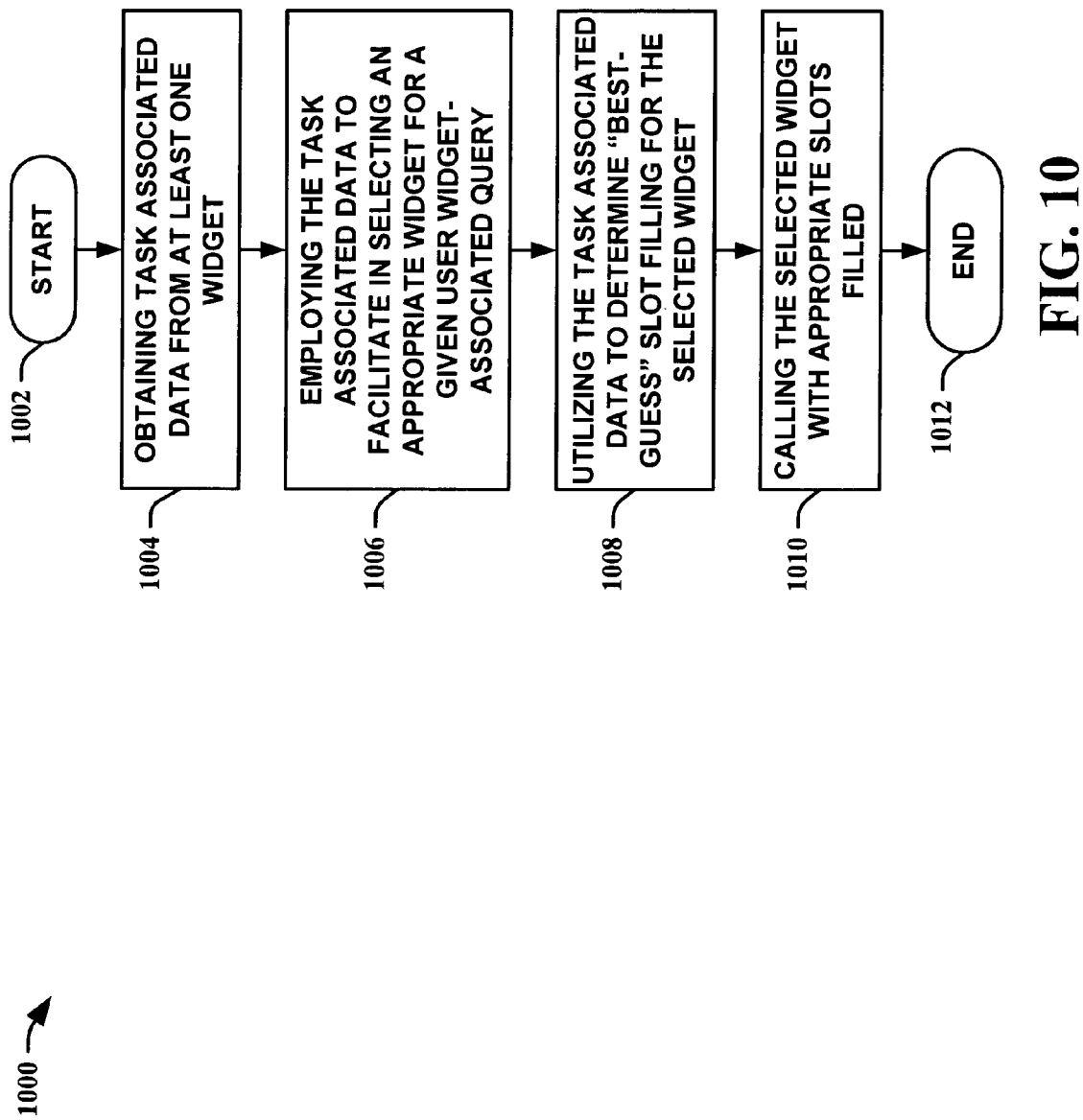
FIG. 10 is a flow diagram of a method of facilitating widget searching in accordance with an aspect of an embodiment.
Figure 11:
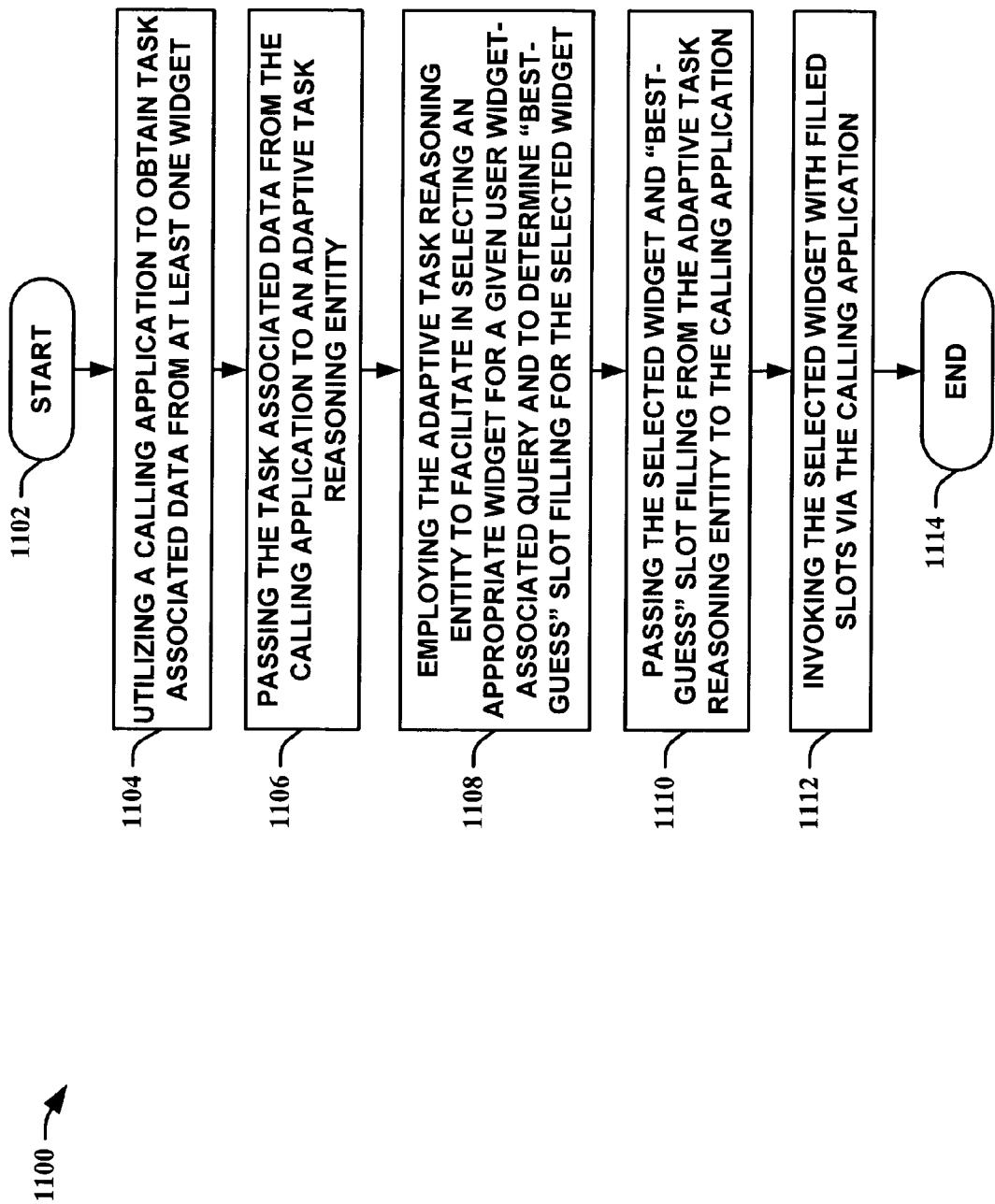
FIG. 11 is another flow diagram of a method of facilitating widget searching in accordance with an aspect of an embodiment.
Figure 12:
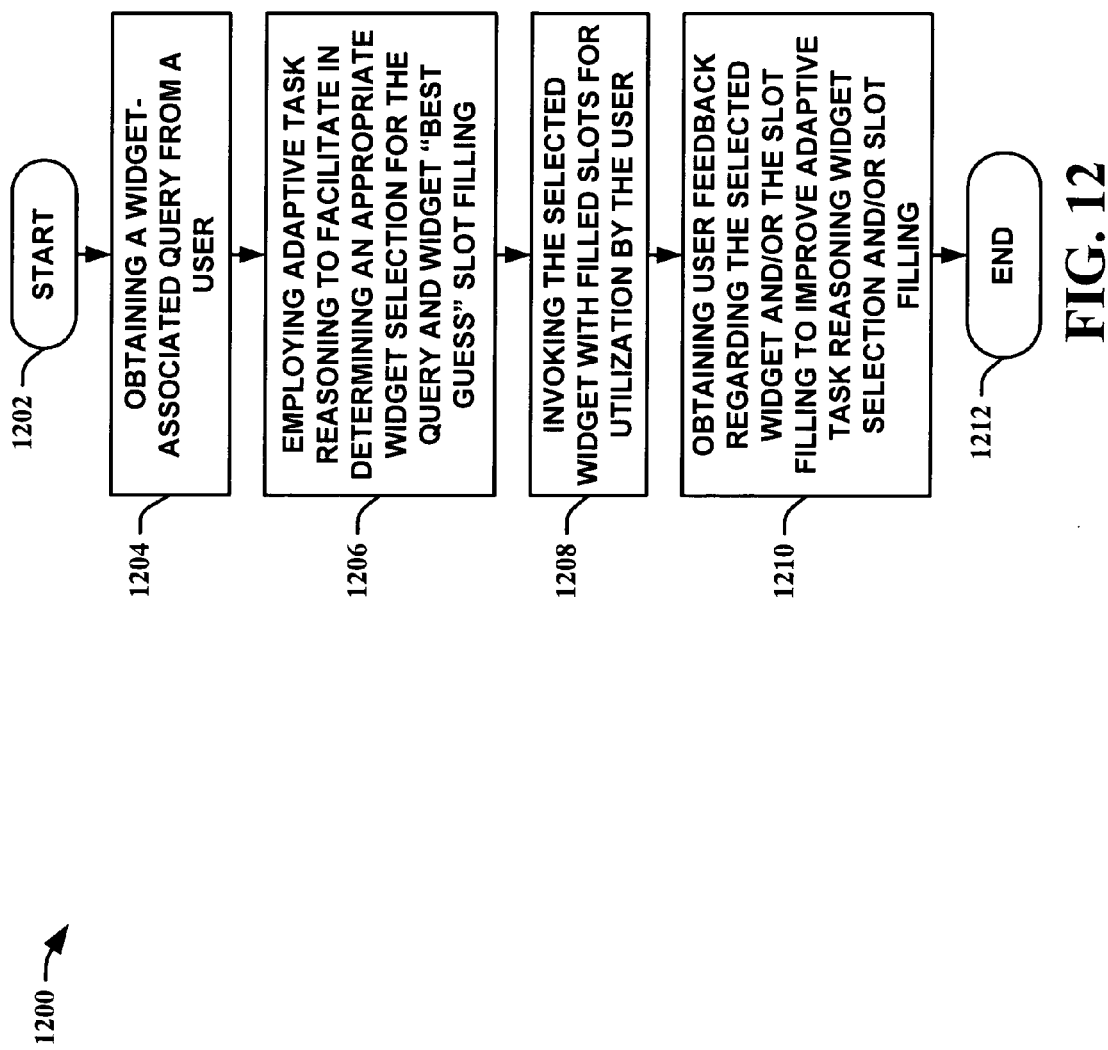
FIG. 12 is a flow diagram of a method of facilitating widget searching utilizing user feedback in accordance with an aspect of an embodiment.

In view of the exemplary systems shown and described above, methodologies that may be implemented in accordance with the embodiments will be better appreciated with reference to the flow charts of FIGS. 10-12. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 10, a flow diagram of a method 1000 of facilitating widget searching in accordance with an aspect of an embodiment is shown. The method 1000 starts 1002 by obtaining task associated data from at least one widget 1004. The task associated data can include, but is not limited to, widget task capabilities and/or widget slot information for performing a task and the like and is based upon aspects of ADAPTIVE TASK FRAMEWORK mechanisms (U.S. patent application Ser. Nos. 11/270,393 and 11/270,407). The task associated data is employed to facilitate in selecting an appropriate widget for a given user widget-associated query 1006. Semantic reasoning aspects from ADAPTIVE SEMANTIC REASONING ENGINE (see, U.S. patent application Ser. No. 11/290, 076) are typically utilized to facilitate this process. The query is processed to determine an appropriate task and/or slot information that can be utilized to pre-fill widget slots. The task associated data is then utilized to determine "best-guess" slot filling for the selected widget 1008. The selected widget with appropriate slots filled is then called 1010, ending the flow 1012.

Looking at FIG. 11, another flow diagram of a method 1100 of facilitating widget searching in accordance with an aspect of an embodiment is depicted. The method 1100 starts 1102 by utilizing a calling application to obtain task associated data from at least one widget 1104. A calling application can include, but is not limited to, applications such as search engines and/or toolbars and the like. The task associated data can include, but is not limited to, widget task capabilities and/or widget slot information for performing a task and the like and is based upon aspects of ADAPTIVE TASK FRAMEWORK mechanisms (U.S. patent application Ser. Nos. 11/270,393 and 11/270,407). The task associated data is then passed from the calling application to an adaptive task reasoning entity 1106. The adaptive task reasoning entity utilizes, at least in part, semantic reasoning aspects from ADAPTIVE SEMANTIC REASONING ENGINE (see, U.S. patent application Ser. No. 11/290,076). The adaptive task reasoning entity can be, but is not limited to, a component and/or a system that performs task reasoning. The adaptive task reasoning entity is then employed to facilitate in selecting an appropriate widget for a given user widget-associated query and to determine "best-guess" slot filling for the selected widget 1108. The selected widget and "best-guess" slot filling from the adaptive task reasoning entity is then passed to the calling application 1110. The selected widget with filled slots is then invoked via the calling application 1112, ending the flow 1114.

Turning to FIG. 12, a flow diagram of a method 1200 of facilitating widget searching utilizing user feedback in accordance with an aspect of an embodiment is illustrated. The method 1200 starts 1202 by obtaining a widget-associated query from a user 1204. The query can be obtained directly and/or indirectly (e.g., via a Web browser, etc.) from the user. Adaptive task reasoning is then employed to facilitate in determining an appropriate widget selection for the query and widget "best guess" slot filling 1206. The adaptive task reasoning is based on, at least in part, semantic reasoning aspects from ADAPTIVE SEMANTIC REASONING ENGINE (see, U.S. patent application Ser. No. 11/290,076). The selected widget with filled slots is then invoked for utilization by the user 1208. User feedback regarding the selected widget and/or the slot filling is then obtained to improve adaptive task reasoning widget selection and/or slot filling 1210, ending the flow 1212. An adaptive semantic reasoning engine can be utilized to facilitate performance improvements on the widget selection process and/or the widget slot matching/filling process. The adaptive reasoning engine can employ statistical learning models (e.g., Hidden Markov Models (HMM) for semantic slot-filling, Naïve Bayesian models for Information Retrieval (IR), Max Entropy Minimum Divergence (MEMD) for ranking and/or query and context to asset mapping).

Figure 13:
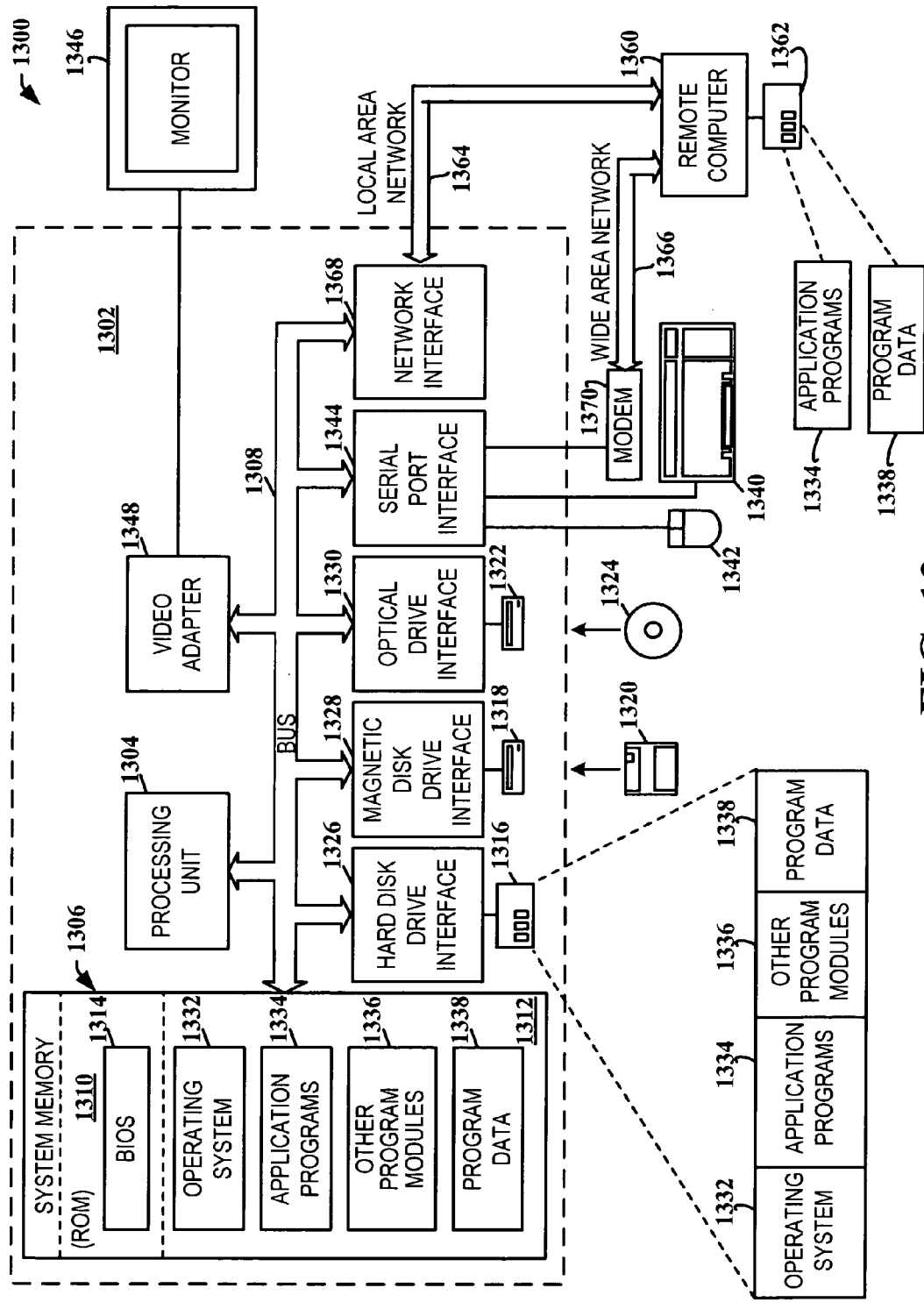
FIG. 13 illustrates an example operating environment in which an embodiment can function.

In order to provide additional context for implementing various aspects of the embodiments, FIG. 13 and the following discussion is intended to provide a brief, general description of a suitable computing environment 1300 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on standalone computers. In a distributed computing environment, program modules can be located in local and/or remote memory storage devices.

With reference to FIG. 13, an exemplary system environment 1300 for performing the various aspects of the embodiments include a conventional computer 1302, including a processing unit 1304, a system memory 1306, and a system bus 1308 that couples various system components, including the system memory, to the processing unit 1304. The processing unit 1304 can be any commercially available or proprietary processor. In addition, the processing unit can be implemented as multi-processor formed of more than one processor, such as can be connected in parallel.

The system bus 1308 can be any of several types of bus structure including a memory bus or memory controller, a peripheral bus, and a local bus using any of a variety of conventional bus architectures such as PCI, VESA, Microchannel, ISA, and EISA, to name a few. The system memory 1306 includes read only memory (ROM) 1310 and random access memory (RAM) 1312. A basic input/output system (BIOS) 1314, containing the basic routines that help to transfer information between elements within the computer 1302, such as during start-up, is stored in ROM 1310.

The computer 1302 also can include, for example, a hard disk drive 1316, a magnetic disk drive 1318, e.g., to read from or write to a removable disk 1320, and an optical disk drive 1322, e.g., for reading from or writing to a CD-ROM disk 1324 or other optical media. The hard disk drive 1316, magnetic disk drive 1318, and optical disk drive 1322 are connected to the system bus 1308 by a hard disk drive interface 1326, a magnetic disk drive interface 1328, and an optical drive interface 1330, respectively. The drives 1316-1322 and their associated computer-readable media provide nonvolatile storage of data, data structures, computer-executable instructions, etc. for the computer 1302. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1300, and further that any such media can contain computer-executable instructions for performing the methods of the embodiments.

A number of program modules can be stored in the drives 1316-1322 and RAM 1312, including an operating system 1332, one or more application programs 1334, other program modules 1336, and program data 1338. The operating system 1332 can be any suitable operating system or combination of operating systems. By way of example, the application programs 1334 and program modules 1336 can include a widget searching scheme in accordance with an aspect of an embodiment.

A user can enter commands and information into the computer 1302 through one or more user input devices, such as a keyboard 1340 and a pointing device (e.g., a mouse 1342). Other input devices (not shown) can include a microphone, a joystick, a game pad, a satellite dish, a wireless remote, a scanner, or the like. These and other input devices are often connected to the processing unit 1304 through a serial port interface 1344 that is coupled to the system bus 1308, but can be connected by other interfaces, such as a parallel port, a game port or a universal serial bus (USB). A monitor 1346 or other type of display device is also connected to the system bus 1308 via an interface, such as a video adapter 1348. In addition to the monitor 1346, the computer 1302 can include other peripheral output devices (not shown), such as speakers, printers, etc.

It is to be appreciated that the computer 1302 can operate in a networked environment using logical connections to one or more remote computers 1360. The remote computer 1360 can be a workstation, a server computer, a router, a peer device or other common network node, and typically includes many or all of the elements described relative to the computer 1302, although for purposes of brevity, only a memory storage device 1362 is illustrated in FIG. 13. The logical connections depicted in FIG. 13 can include a local area network (LAN) 1364 and a wide area network (WAN) 1366. Such networking environments are commonplace in offices, enterprise-wide computer networks, intranets and the Internet.

When used in a LAN networking environment, for example, the computer 1302 is connected to the local network 1364 through a network interface or adapter 1368. When used in a WAN networking environment, the computer 1302 typically includes a modem (e.g., telephone, DSL, cable, etc.) 1370, or is connected to a communications server on the LAN, or has other means for establishing communications over the WAN 1366, such as the Internet. The modem 1370, which can be internal or external relative to the computer 1302, is connected to the system bus 1308 via the serial port interface 1344. In a networked environment, program modules (including application programs 1334) and/or program data 1338 can be stored in the remote memory storage device

1362. It will be appreciated that the network connections shown are exemplary and other means (e.g., wired or wireless) of establishing a communications link between the computers 1302 and 1360 can be used when carrying out an aspect of an embodiment.

In accordance with the practices of persons skilled in the art of computer programming, the embodiments have been described with reference to acts and symbolic representations of operations that are performed by a computer, such as the computer 1302 or remote computer 1360, unless otherwise indicated. Such acts and operations are sometimes referred to as being computer-executed. It will be appreciated that the acts and symbolically represented operations include the manipulation by the processing unit 1304 of electrical signals representing data bits which causes a resulting transformation or reduction of the electrical signal representation, and the maintenance of data bits at memory locations in the memory system (including the system memory 1306, hard drive 1316, floppy disks 1320, CD-ROM 1324, and remote memory 1362) to thereby reconfigure or otherwise alter the computer system's operation, as well as other processing of signals. The memory locations where such data bits are maintained are physical locations that have particular electrical, magnetic, or optical properties corresponding to the data bits.

Figure 14:
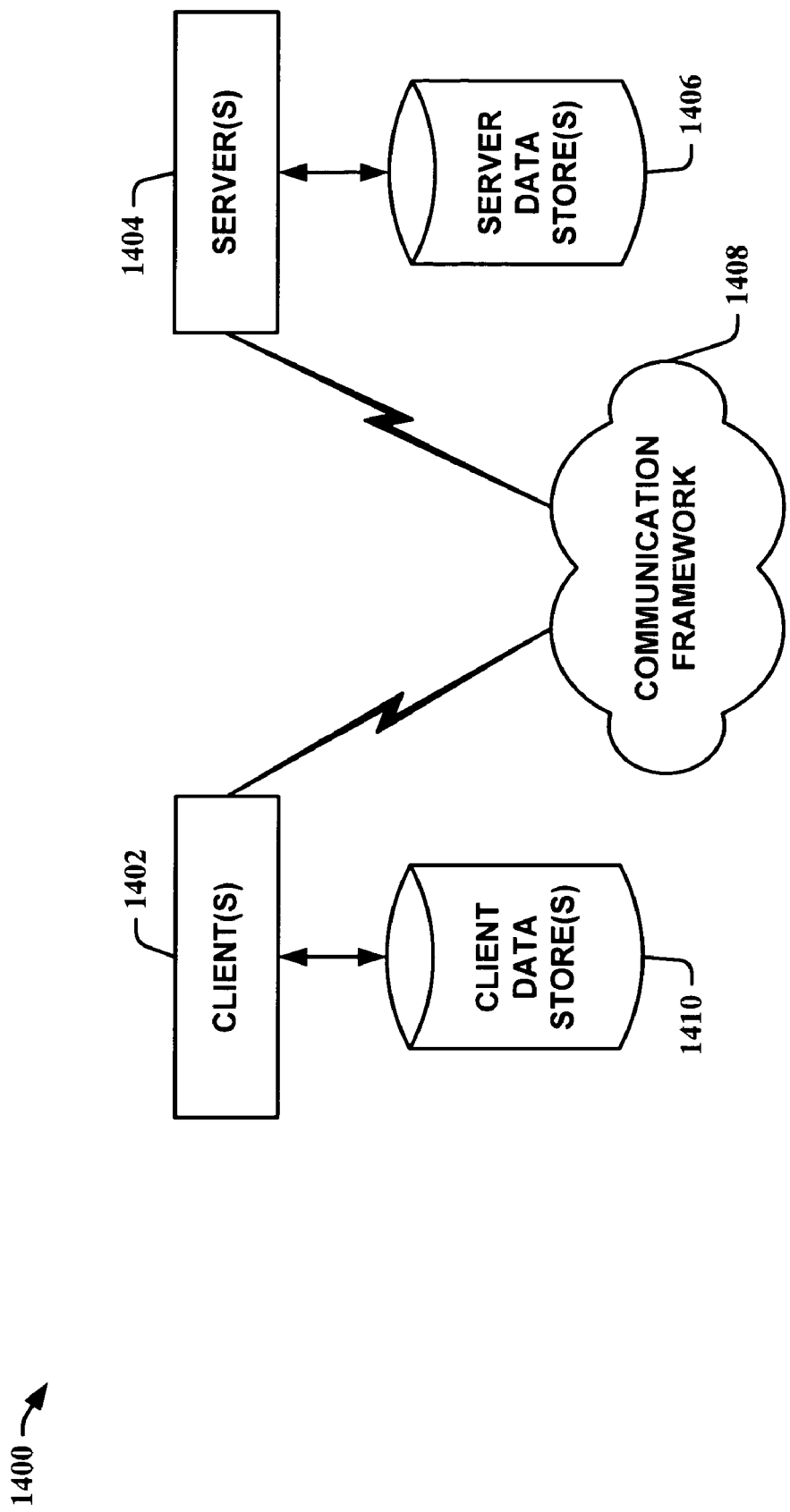
FIG. 14 illustrates another example operating environment in which an embodiment can function.

FIG. 14 is another block diagram of a sample computing environment 1400 with which embodiments can interact. The system 1400 further illustrates a system that includes one or more client(s) 1402. The client(s) 1402 can be hardware and/or software (e.g., threads, processes, computing devices). The system 1400 also includes one or more server(s) 1404. The server(s) 1404 can also be hardware and/or software (e.g., threads, processes, computing devices). One possible communication between a client 1402 and a server 1404 can be in the form of a data packet adapted to be transmitted between two or more computer processes. The system 1400 includes a communication framework 1408 that can be employed to facilitate communications between the client(s) 1402 and the server(s) 1404. The client(s) 1402 are connected to one or more client data store(s) 1410 that can be employed to store information local to the client(s) 1402. Similarly, the server(s) 1404 are connected to one or more server data store(s) 1406 that can be employed to store information local to the server(s) 1404.

It is to be appreciated that the systems and/or methods of the embodiments can be utilized in widget search facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable storage medium having computer-executable components stored thereon that facilitates widget searching, comprising:
    a calling application component that receives a natural language query and is associated with a plurality of widgets configured to expose parametric task data to the calling application component and including one or more widgets associated with the natural language query, wherein the calling application interfaces with the plurality of widgets to obtain parametric task data from each of the plurality of widgets, the parametric task data includes at least one of task capabilities, types of acceptable slots, or information to facilitate filling of widget slots based on the query; and
    an adaptive task reasoning component that receives the natural language query from the calling application component and utilizes the obtained parametric task data to automatically select one or more appropriate widgets from among the plurality of widgets in response to the natural language query, wherein the adaptive task reasoning component further determines appropriate slot filling for the selected widgets from the obtained parametric task data, and provides the slot filling for each of the selected widgets to the calling application component;
    wherein the calling application component invokes a widget using the slot filling for that widget to allow a user to utilize the functionality of the one or more selected widgets, the widget selected from among the one or more widgets selected by the adaptive task reasoning component in response to the natural language query, and wherein the adaptive task reasoning component employs user feedback related to at least one selected widget to facilitate in subsequent widget selections and slot filling in response to subsequent natural language queries.

2. The computer readable storage medium of claim 1, the calling application component receives the natural language query directly from a user or via a Web browser.

3. The computer readable storage medium of claim 1, the calling application component or the adaptive task reasoning component resides on a server.

4. The computer readable storage medium of claim 1, the natural language query comprising a modality independent query input.

5. A server-side widget search system that utilizes the computer readable storage medium of claim 1 to facilitate in providing at least one appropriate widget to a user via a Web browser.

6. The computer readable storage medium of claim 1, wherein, upon determination that the one or more widgets includes a single widget, the calling application component provides the selected widget to the user without providing another widget concurrently.

7. A computer-implemented method for facilitating widget searching, comprising:
    employing a calling application to obtain task associated data exposed by each of a plurality of widgets, each widget residing on a client or server and configured to expose the task associated data to the calling application, the task associated data includes widget task capabilities, types of acceptable slots, or information to facilitate widget slot filling;
    receiving a user query associated with one or more of the plurality of widgets, wherein the user query is a natural language query;

passing the task associated data from the calling application to a task reasoning process that is based, at least in part, on an adaptive semantic reasoning engine;

employing the adaptive task reasoning engine to apply adaptive task reasoning and the task associated data obtained from the plurality of widgets to facilitate in selecting one or more appropriate widgets responsive to the user query;

utilizing the task associated data to determine slot filling for the selected widgets;

employing selected widget feedback from a user to facilitate in determining the one or more appropriate widgets and slot filling in response to the user query; and calling at least one of the selected widgets with appropriate slots filled.

8. The method of claim 7 further comprising:

receiving the user query associated with one or more of the plurality of widgets directly from a user and/or via a Web browser.

9. The method of claim 7 further comprising:

relaying the selected widgets and slot filling for the selected widgets to the calling application; and invoking at least one of the selected widgets with filled slots for utilization by a user.

10. A widget search method that employs the method of claim 7 to facilitate client-side widget searching.

11. A computer readable storage medium that facilitates widget searching, comprising:

means for receiving a natural language query processible by a widget;

means for determining an appropriate widget and slot filling for the natural language query, employed by an adaptive task reasoning process;

means for invoking the determined widget for interaction with a user, the determined widget configured to expose metadata describing tasks performed by that widget;

means for obtaining user feedback, slot filling data, or metadata related to the system, or a combination thereof, from interaction with the determined widget;

means for determining appropriate slot filling for the selected widget based on the natural language query;

means for filling the appropriate slots of the selected widget based on the natural language query;

means for employing an adaptive semantic reasoning engine to facilitate improvement on the adaptive task reasoning based upon the obtained user feedback, upon the obtained slot filling data, upon the obtained metadata, or a combination thereof, wherein the adaptive semantic reasoning engine employs statistical learning models; and means for employing the user feedback relating to the determined widget to facilitate in future widget selections and slot filling in response to natural language queries.

* * * * *